US012179319B2

(12) United States Patent
Kamiya

(10) Patent No.: US 12,179,319 B2
(45) Date of Patent: Dec. 31, 2024

(54) IMPACT TOOL

(71) Applicant: MAKITA CORPORATION, Anjo (JP)

(72) Inventor: Takeshi Kamiya, Anjo (JP)

(73) Assignee: MAKITA CORPORATION, Anjo (JP)

( * ) Notice: Subject to any disclaimer, the term of this patent is extended or adjusted under 35 U.S.C. 154(b) by 93 days.

(21) Appl. No.: 17/981,569

(22) Filed: Nov. 7, 2022

(65) Prior Publication Data

US 2023/0191565 A1 Jun. 22, 2023

(30) Foreign Application Priority Data

Dec. 17, 2021 (JP) ................................ 2021-205223

(51) Int. Cl.
*B25B 21/02* (2006.01)
*B25F 5/00* (2006.01)

(52) U.S. Cl.
CPC .............. *B25B 21/02* (2013.01); *B25F 5/001* (2013.01)

(58) Field of Classification Search
CPC . B25B 21/02; B25B 19/00; B25F 5/00; B25F 5/001
See application file for complete search history.

(56) References Cited

U.S. PATENT DOCUMENTS

2022/0305625 A1* 9/2022 Kawai .................. B25B 21/026

FOREIGN PATENT DOCUMENTS

EP 2248633 A1 * 11/2010 ........... B23B 31/107
JP 3652918 B2 5/2005

* cited by examiner

*Primary Examiner* — Daniel Jeremy Leeds
(74) *Attorney, Agent, or Firm* — Oliff PLC

(57) ABSTRACT

To reduce size increase, an impact tool includes a motor, a spindle located frontward from the motor and rotatable by the motor, a hammer supported by the spindle, an anvil strikable by the hammer in a rotation direction and having an insertion hole extending rearward from a front end of the anvil, a locking member supported by the anvil and movable to a locking position for locking a tip tool placed in the insertion hole and to an unlocking position for unlocking the tip tool, and a bit sleeve surrounding the anvil. The bit sleeve is movable to a movement-restricting position for restricting radially outward movement of the locking member and to a movement-permitting position for permitting radially outward movement of the locking member. The bit sleeve is at least partly between the hammer and the anvil in a radial direction.

16 Claims, 32 Drawing Sheets

IMPACT TOOL

CROSS-REFERENCE TO RELATED APPLICATIONS

This application claims the benefit of priority to Japanese Patent Application No. 2021-205223, filed on Dec. 17, 2021, the entire contents of which are hereby incorporated by reference.

BACKGROUND

1. Technical Field

The present disclosure relates to an impact tool.

2. Description of the Background

In the technical field of impact tools, a known power tool is described in Japanese Patent No. 3652918.

BRIEF SUMMARY

For improved operability, an impact tool has less size increase.

One or more aspects of the present disclosure are directed to an impact tool with less size increase.

A first aspect of the present disclosure provides an impact tool, including:

a motor;

a spindle located frontward from the motor and rotatable by the motor;

a hammer supported by the spindle;

an anvil strikable by the hammer in a rotation direction, the anvil having an insertion hole extending rearward from a front end of the anvil;

a locking member supported by the anvil and movable to a locking position for locking a tip tool placed in the insertion hole and to an unlocking position for unlocking the tip tool; and a bit sleeve surrounding the anvil, the bit sleeve being movable to a movement-restricting position for restricting radially outward movement of the locking member and to a movement-permitting position for permitting radially outward movement of the locking member, the bit sleeve being at least partly between the hammer and the anvil in a radial direction.

A second aspect of the present disclosure provides an impact tool, including:

a motor;

a spindle located frontward from the motor and rotatable by the motor;

a hammer supported by the spindle;

an anvil strikable by the hammer in a rotation direction, the anvil having an insertion hole extending rearward from a front end of the anvil;

a bearing supporting the anvil in a rotatable manner;

a locking member supported by the anvil and movable to a locking position for locking a tip tool placed in the insertion hole and to an unlocking position for unlocking the tip tool; and a bit sleeve surrounding the anvil, the bit sleeve being movable to a movement-restricting position for restricting radially outward movement of the locking member and to a movement-permitting position for permitting radially outward movement of the locking member, the bit sleeve being located rearward from the bearing.

A third aspect of the present disclosure provides an impact tool, including:

a motor;

a spindle located frontward from the motor and rotatable by the motor;

a hammer supported by the spindle;

an anvil strikable by the hammer in a rotation direction, the anvil having an insertion hole extending rearward from a front end of the anvil;

a hammer case accommodating at least a part of the anvil;

a locking member supported by the anvil and movable to a locking position for locking a tip tool placed in the insertion hole and to an unlocking position for unlocking the tip tool; and a bit sleeve surrounding the anvil, the bit sleeve being movable to a movement-restricting position for restricting radially outward movement of the locking member and to a movement-permitting position for permitting radially outward movement of the locking member, the bit sleeve being accommodated in the hammer case.

The impact tool according to the above aspects of the present disclosure has less size increase.

DETAILED DESCRIPTION

One or more embodiments will now be described with reference to the drawings. The components in the embodiments described below may be combined as appropriate. One or more components may be eliminated.

In the embodiments, the positional relationships between the components will be described using the directional terms such as right and left (or lateral), front and rear (or frontward and rearward), and up and down (or vertical). The terms indicate relative positions or directions with respect to the center of a power tool 1. The power tool 1 according to the embodiments is a rotary tool including an output shaft rotatable about a rotation axis AX.

In the embodiments, a direction parallel to the rotation axis AX is referred to as an axial direction or axially for convenience. A direction about the rotation axis AX is referred to as a circumferential direction or circumferentially, or a rotation direction for convenience. A direction radial from the rotation axis AX is referred to as a radial direction or radially for convenience.

A predetermined axial direction away from the center of the power tool 1, or a position farther from the center of the power tool 1 in the predetermined axial direction, is referred to as a first axial direction for convenience. The direction opposite to the first axial direction is referred to as a second axial direction for convenience. A predetermined circumferential direction is referred to as a first circumferential direction for convenience. The direction opposite to the first circumferential direction is referred to as a second circumferential direction for convenience. A radial direction away from the rotation axis AX, or a position farther from the rotation axis AX in the radial direction, is referred to as radially outward for convenience. The direction opposite to radially outward is referred to as radially inward for convenience.

In the embodiments, the axial direction corresponds to the front-rear direction. The first axial direction may be the front direction. The second axial direction may be the rear direction.

The power tool 1 according to the embodiments is an impact tool. The impact tool may be, for example, an impact driver or an impact wrench.

First Embodiment

A first embodiment will now be described. The power tool 1 according to the present embodiment is an impact driver.

Overview of Power Tool

Figure 1:
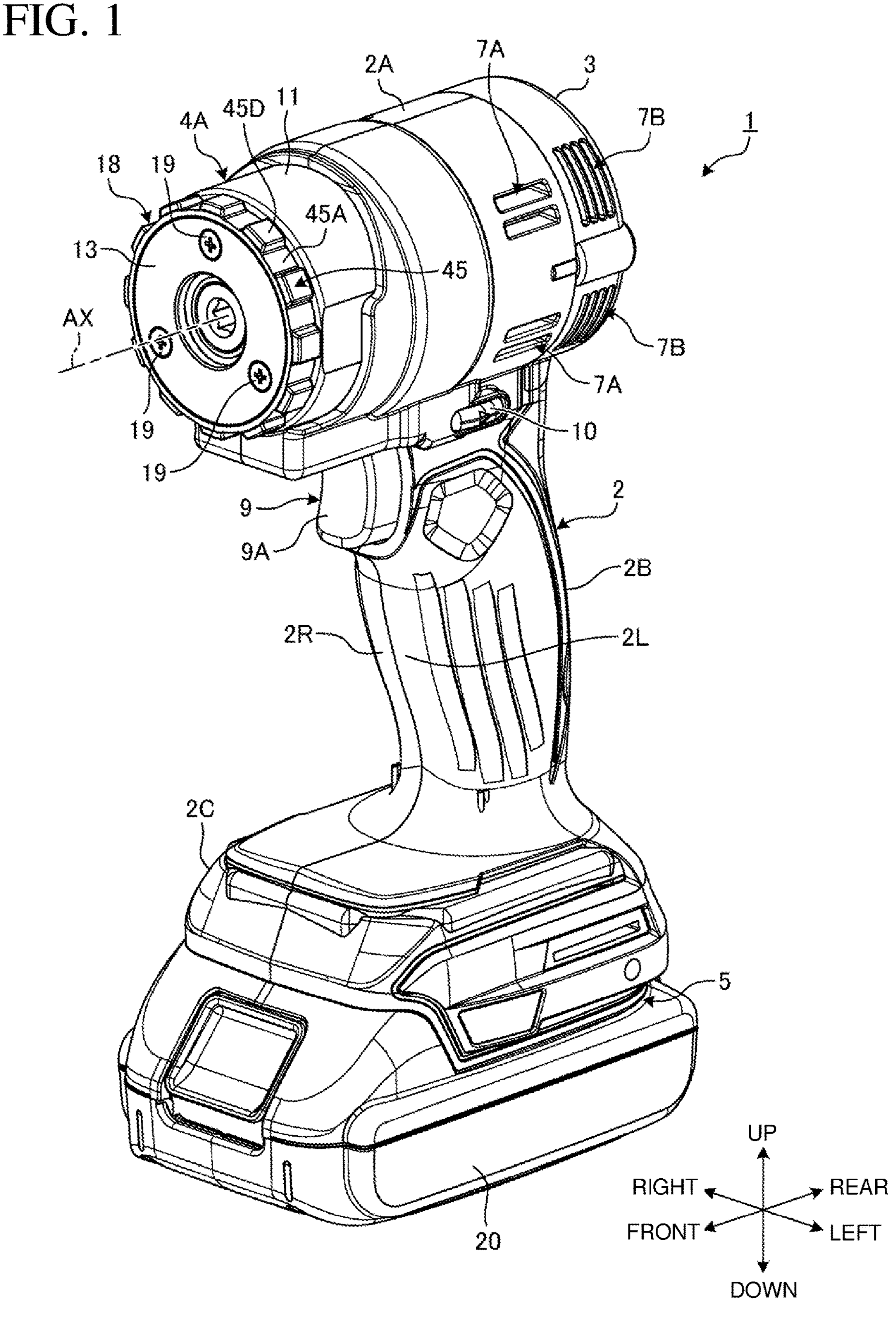
FIG. 1 is a front perspective view of a power tool according to a first embodiment.
Figure 2:
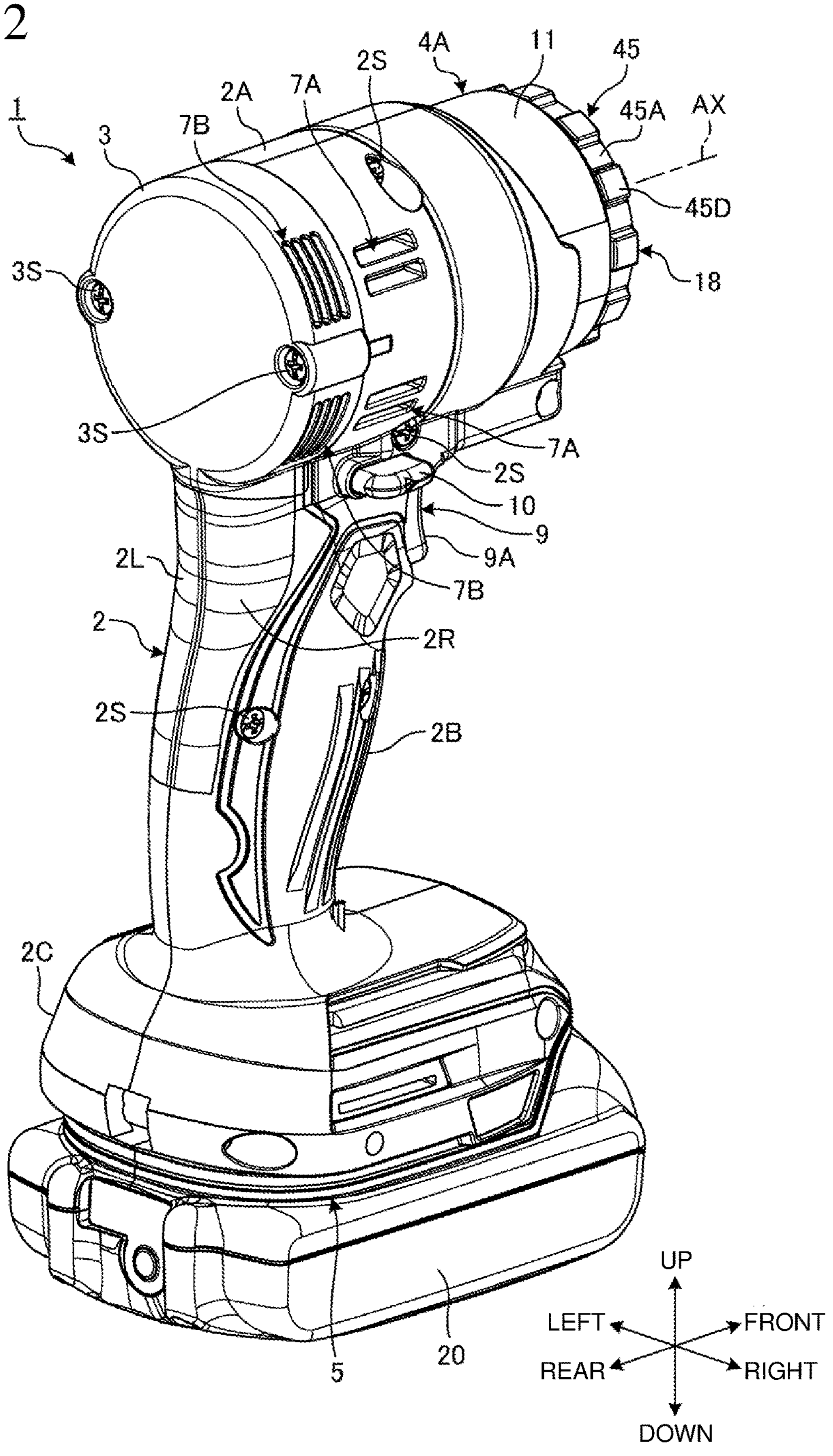
FIG. 2 is a rear perspective view of the power tool according to the first embodiment.
Figure 3:
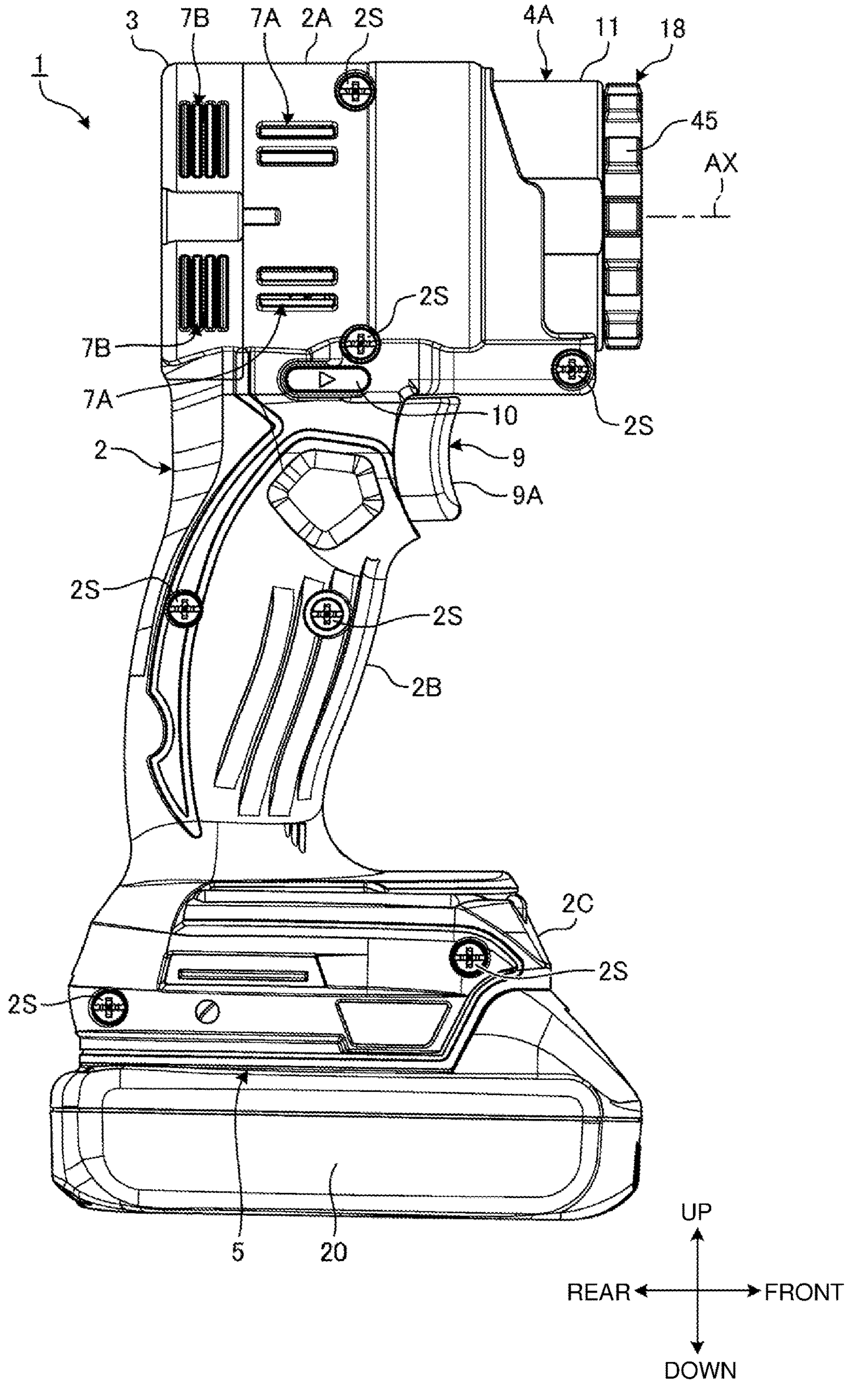
FIG. 3 is a side view of the power tool according to the first embodiment.
Figure 4:
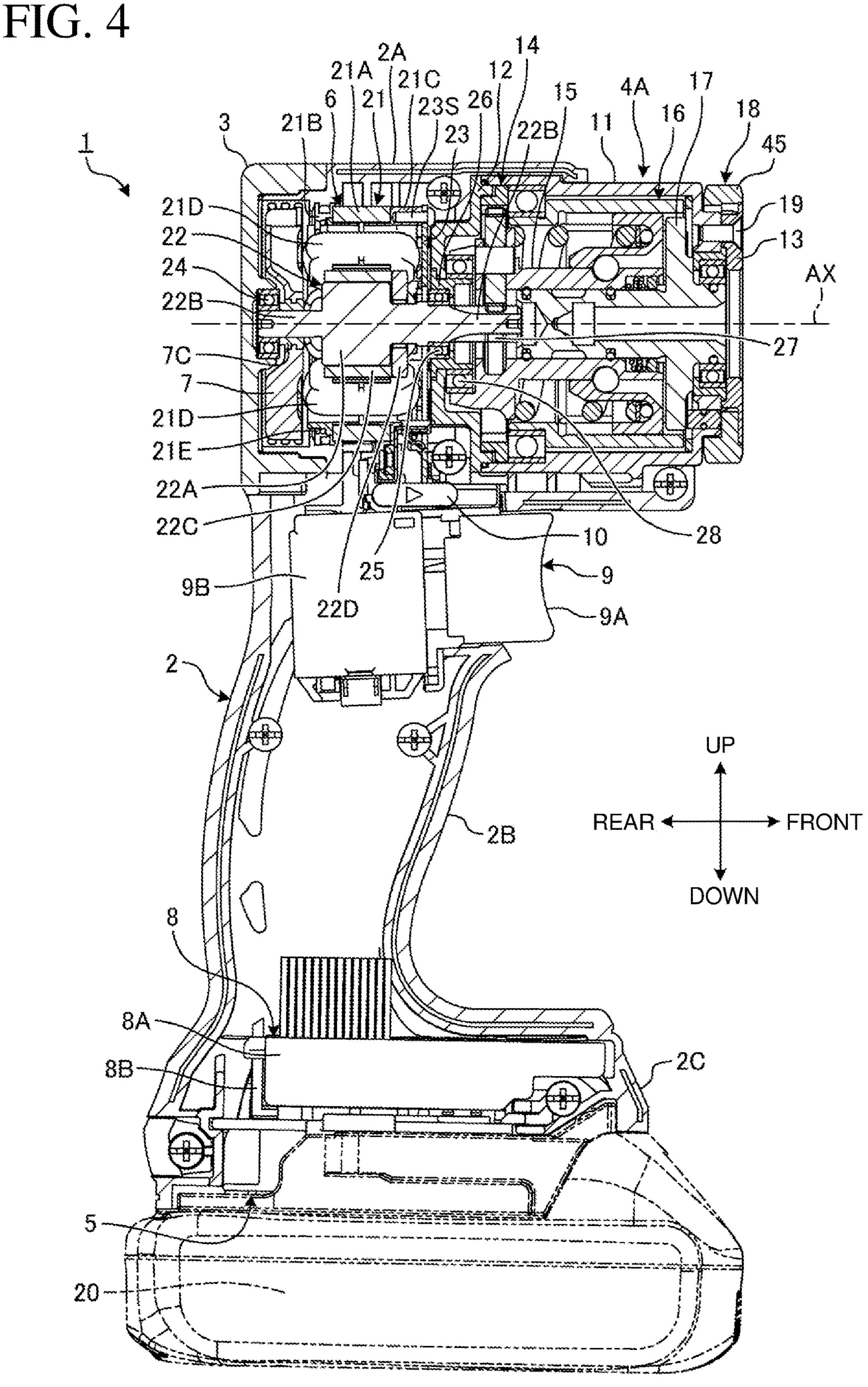
FIG. 4 is a longitudinal sectional view of the power tool according to the first embodiment.

FIG. 1 is a front perspective view of the power tool 1 according to the present embodiment. FIG. 2 is a rear perspective view of the power tool 1 according to the present embodiment. FIG. 3 is a side view of the power tool 1 according to the present embodiment. FIG. 4 is a longitudinal sectional view of the power tool 1 according to the present embodiment.

The power tool 1 includes a housing 2, a rear cover 3, a body assembly 4A, a battery mount 5, a motor 6, a fan 7, a controller 8, a trigger switch 9, and a forward-reverse switch lever 10.

The housing 2 accommodates at least parts of components of the power tool 1. The housing 2 is formed from a synthetic resin. The housing 2 in the present embodiment is formed from nylon. The housing 2 includes a pair of housing halves. The housing 2 includes a left housing 2L and a right housing 2R. The right housing 2R is located on the right of the left housing 2L. The left housing 2L and the right housing 2R are fastened together with multiple screws 2S.

The housing 2 includes a motor compartment 2A, a grip 2B, and a battery holder 2C.

The motor compartment 2A accommodates the motor 6. The motor compartment 2A is cylindrical.

The grip 2B is grippable by an operator. The grip 2B protrudes downward from the motor compartment 2A. The trigger switch 9 is located in an upper portion of the grip 2B.

The battery holder 2C holds a battery pack 20 with the battery mount 5. The battery holder 2C accommodates the controller 8. The battery holder 2C is connected to the lower end of the grip 2B. In the front-rear direction and the lateral direction, the battery holder 2C has a larger outer dimension than the grip 2B.

The rear cover 3 covers an opening in the motor compartment 2A at the rear end. The rear cover 3 is located behind the motor compartment 2A. The rear cover 3 is formed from a synthetic resin. The rear cover 3 is fastened to the rear end of the motor compartment 2A with two screws 3S. The rear cover 3 accommodates the fan 7.

The motor compartment 2A has inlets 7A. The rear cover 3 has outlets 7B. Air outside the housing 2 flows into the housing 2 through the inlets 7A. Air inside the housing 2 flows out of the housing 2 through the outlets 7B.

The body assembly 4A is located frontward from the motor 6. The body assembly 4A includes a hammer case 11, a gear case 12, a front cover 13, a reducer 14, a spindle 15, a striker 16, an anvil 17, and a tool holder 18.

The hammer case 11 is formed from metal. The hammer case 11 in the present embodiment is formed from aluminum. The hammer case 11 is at least partly located frontward from the motor compartment 2A. The hammer case 11 is cylindrical. The gear case 12 is fixed to the rear end of the hammer case 11. The front cover 13 is fastened to the front end of the hammer case 11 with three screws 19. The gear case 12 and a rear portion of the hammer case 11 are located in the motor compartment 2A. The gear case 12 and the rear portion of the hammer case 11 are held between the left housing 2L and the right housing 2R. The gear case 12 and the hammer case 11 are each fixed to the motor compartment 2A.

At least parts of the reducer 14, the spindle 15, the striker 16, the anvil 17, and the tool holder 18 are located in an internal space of the body assembly 4A defined by the hammer case 11, the gear case 12, and the front cover 13.

The battery mount 5 removably receives the battery pack 20. The battery mount 5 is located in a lower portion of the battery holder 2C. The battery pack 20 is placed onto the battery mount 5 from the front of the battery holder 2C and is thus attached to the battery mount 5. The battery pack 20 is pulled forward along the battery mount 5 and is thus removed from the battery mount 5. The battery pack 20 includes a secondary battery. The battery pack 20 in the present embodiment includes a rechargeable lithium-ion battery. The battery pack 20 is attached to the battery mount 5 to power the power tool 1. The motor 6 is driven by power supplied from the battery pack 20. The controller 8 operates on power supplied from the battery pack 20.

The motor 6 is a power source for the power tool 1. The motor 6 is an electric motor. The motor 6 is a brushless inner-rotor motor. The motor 6 includes a stator 21 and a rotor 22. The rotor 22 is at least partly located inside the stator 21. The rotor 22 rotates relative to the stator 21.

The stator 21 includes a stator core 21A, a rear insulator 21B, a front insulator 21C, and multiple coils 21D.

The stator core 21A is fixed to the motor compartment 2A. The stator core 21A is held between the left housing 2L and the right housing 2R. The stator core 21A is located radially outward from the rotor 22. The stator core 21A includes multiple steel plates stacked on one another. The steel plates are metal plates formed from iron as a main component. The stator core 21A is cylindrical. The stator core 21A includes multiple teeth to support the coils 21D.

The rear insulator 21B is located on the rear of the stator core 21A. The front insulator 21C is located on the front of the stator core 21A. The rear insulator 21B and the front insulator 21C are electrical insulating members formed from a synthetic resin. The rear insulator 21B covers parts of the surfaces of the teeth. The front insulator 21C covers parts of the surfaces of the teeth.

The coils 21D are attached to the stator core 21A with the rear insulator 21B and the front insulator 21C in between. The coils 21D surround the teeth on the stator core 21A with the rear insulator 21B and the front insulator 21C in between. The coils 21D and the stator core 21A are electrically insulated from each other with the rear insulator 21B and the front insulator 21C. The coils 21D are connected to each other with a connecting wire 21E. The coils 21D are connected to the controller 8 with lead wires (not shown).

The rotor 22 includes a rotor core 22A, a rotor shaft 22B, a rotor magnet 22C, and a sensor magnet 22D.

The rotor core 22A and the rotor shaft 22B are formed from steel. The rotor shaft 22B protrudes from the end faces of the rotor core 22A in the front-rear direction.

The rotor magnet 22C is fixed to the rotor core 22A. The rotor magnet 22C is cylindrical. The rotor magnet 22C surrounds the rotor core 22A.

The sensor magnet 22D is fixed to the rotor core 22A. The sensor magnet 22D is annular. The sensor magnet 22D is located on the front end face of the rotor core 22A and the front end face of the rotor magnet 22C.

A sensor board 23 is attached to the front insulator 21C. The sensor board 23 is fastened to the front insulator 21C with a screw 23S. The sensor board 23 includes an annular circuit board, and a rotation detector supported on the circuit board. The sensor board 23 at least partly faces the sensor magnet 22D. The rotation detector detects the position of the sensor magnet 22D to detect the position of the rotor 22 in the rotation direction.

The rotor shaft 22B has the rear end rotatably supported by a rotor bearing 24. The rotor shaft 22B has the front end rotatably supported by a rotor bearing 25. The rotor bearing 24 is held by the rear cover 3. The rotor bearing 25 is held by a bearing holder 26. The bearing holder 26 is held by the gear case 12. The rotor shaft 22B has the front end located in the internal space of the body assembly 4A through an opening in the bearing holder 26.

A pinion gear 27 is fixed to the front end of the rotor shaft 22B. The pinion gear 27 is connected to at least a part of the reducer 14. The rotor shaft 22B is connected to the reducer 14 with the pinion gear 27 in between.

The fan 7 generates an airflow for cooling the motor 6. The fan 7 is located rearward from the motor 6. The fan 7 is between the rotor bearing 24 and the stator 21. The fan 7 is fastened to at least a part of the rotor 22. The fan 7 is fastened to a rear portion of the rotor shaft 22B with a bush 7C. The fan 7 rotates as the rotor 22 rotates. As the rotor shaft 22B rotates, the fan 7 rotates together with the rotor shaft 22B. Thus, air outside the housing 2 flows into the housing 2 through the inlets 7A. Air flowing into the housing 2 flows through the housing 2 and cools the motor 6. As the fan 7 rotates, air flows out of the housing 2 through the outlets 7B.

The controller 8 outputs control signals for controlling the motor 6. The controller 8 is accommodated in the battery holder 2C. The controller 8 switches the control mode of the motor 6 in accordance with the operation of the power tool 1. The control mode of the motor 6 refers to a method or pattern for controlling the motor 6. The controller 8 includes a circuit board 8A and a case 8B. The circuit board 8A incorporates multiple electronic components. The case 8B accommodates the circuit board 8A. Examples of the electronic components mounted on the circuit board 8A include a processor such as a central processing unit (CPU), a nonvolatile memory such as a read-only memory (ROM) or a storage device, a volatile memory such as a random-access memory (RAM), a transistor, and a resistor.

The trigger switch 9 is operable by the operator to activate the motor 6. The trigger switch 9 is located in the grip 2B. The trigger switch 9 includes a trigger lever 9A and a switch body 9B. The trigger lever 9A protrudes frontward from an upper front portion of the grip 2B. The trigger lever 9A is operable by the operator. The switch body 9B is accommodated in the grip 2B. The trigger lever 9A is operable to switch the motor 6 between the driving state and the stopped state.

The forward-reverse switch lever 10 is operable to change the rotation direction of the motor 6. The forward-reverse switch lever 10 is located in the upper portion of the grip 2B. The forward-reverse switch lever 10 is operable to switch the rotation direction of the motor 6 between forward and reverse. This operation switches the rotation direction of the spindle 15.

Body Assembly

Figure 5:
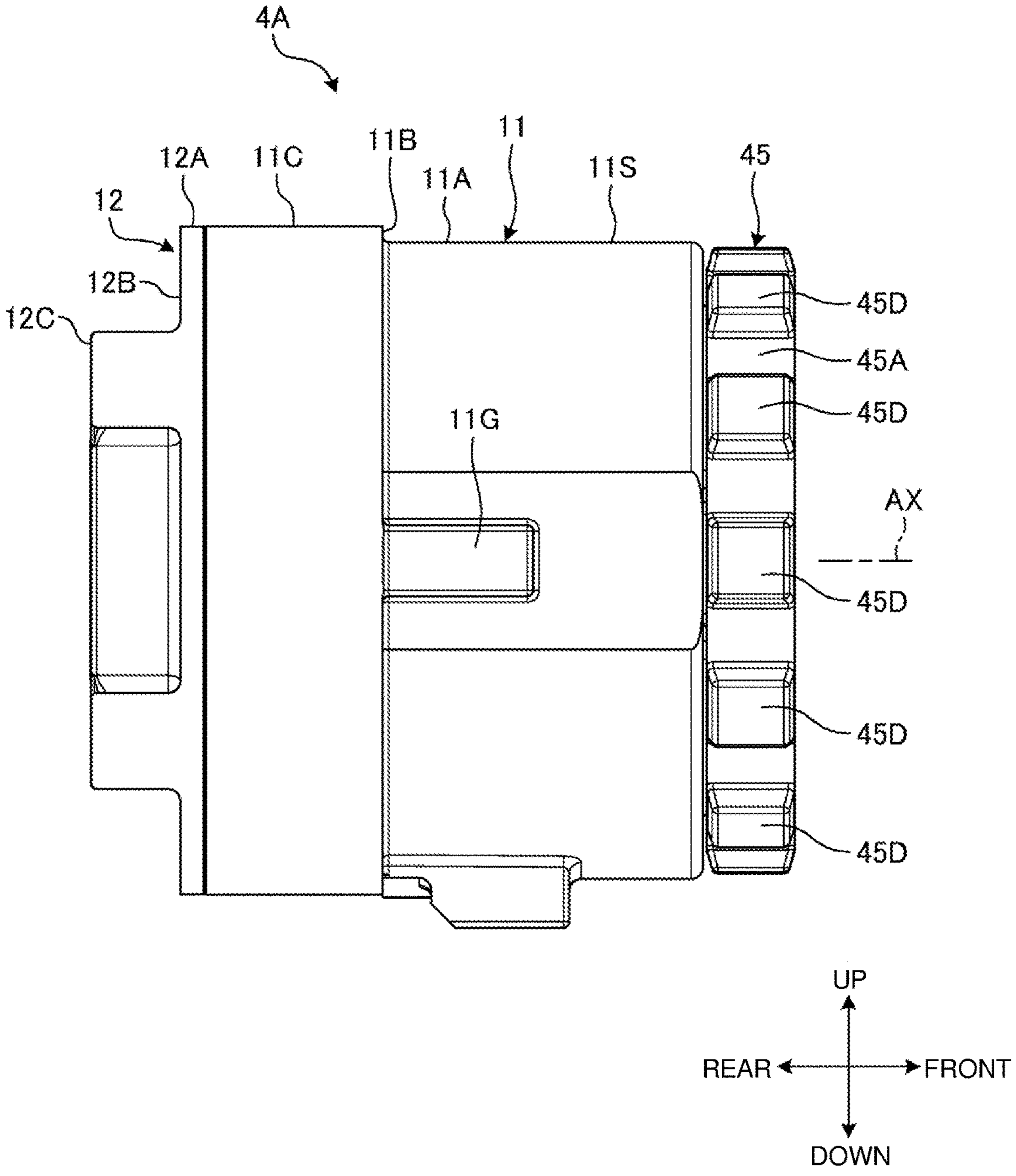
FIG. 5 is a side view of a body assembly in the first embodiment.
Figure 6:
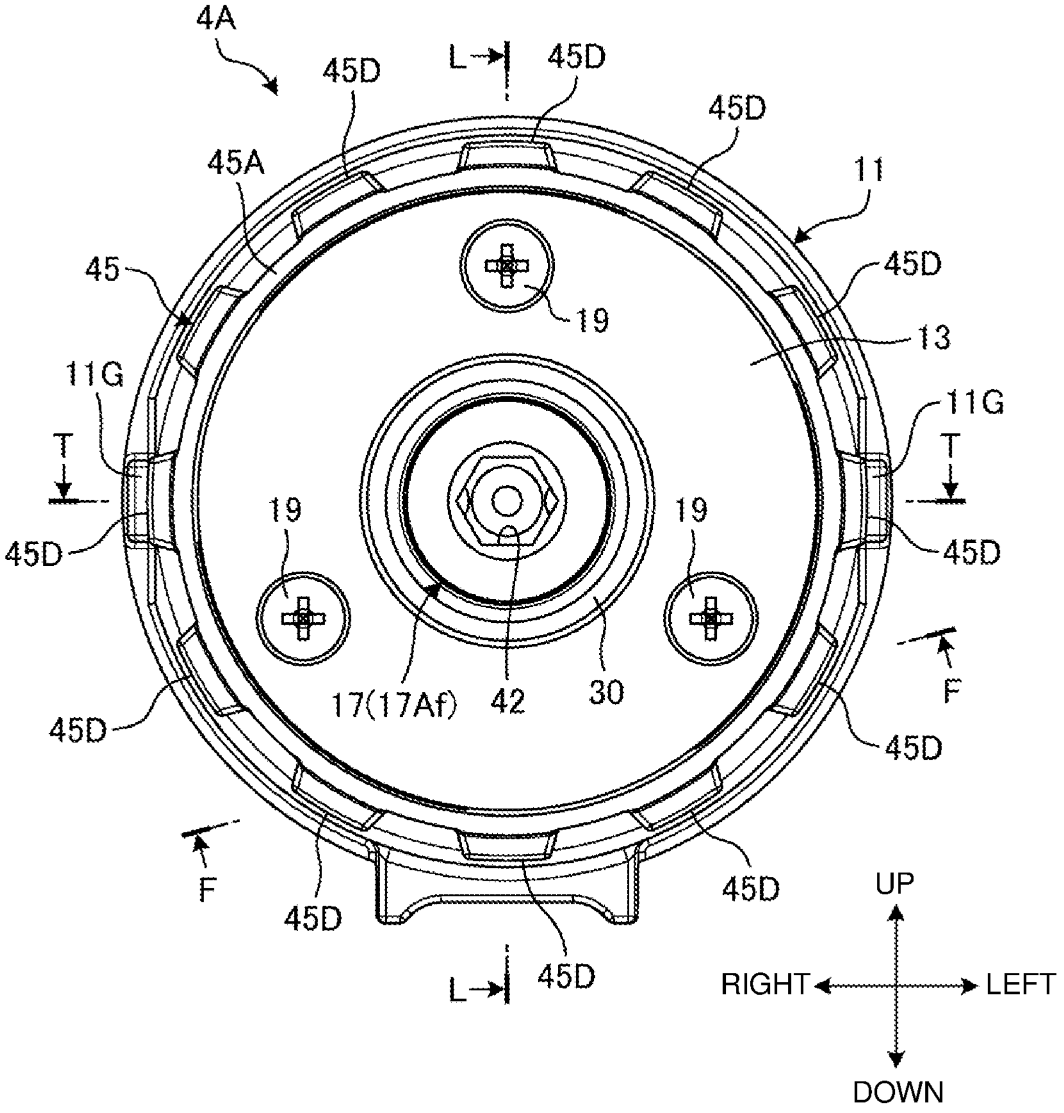
FIG. 6 is a front view of the body assembly in the first embodiment.
Figure 7:
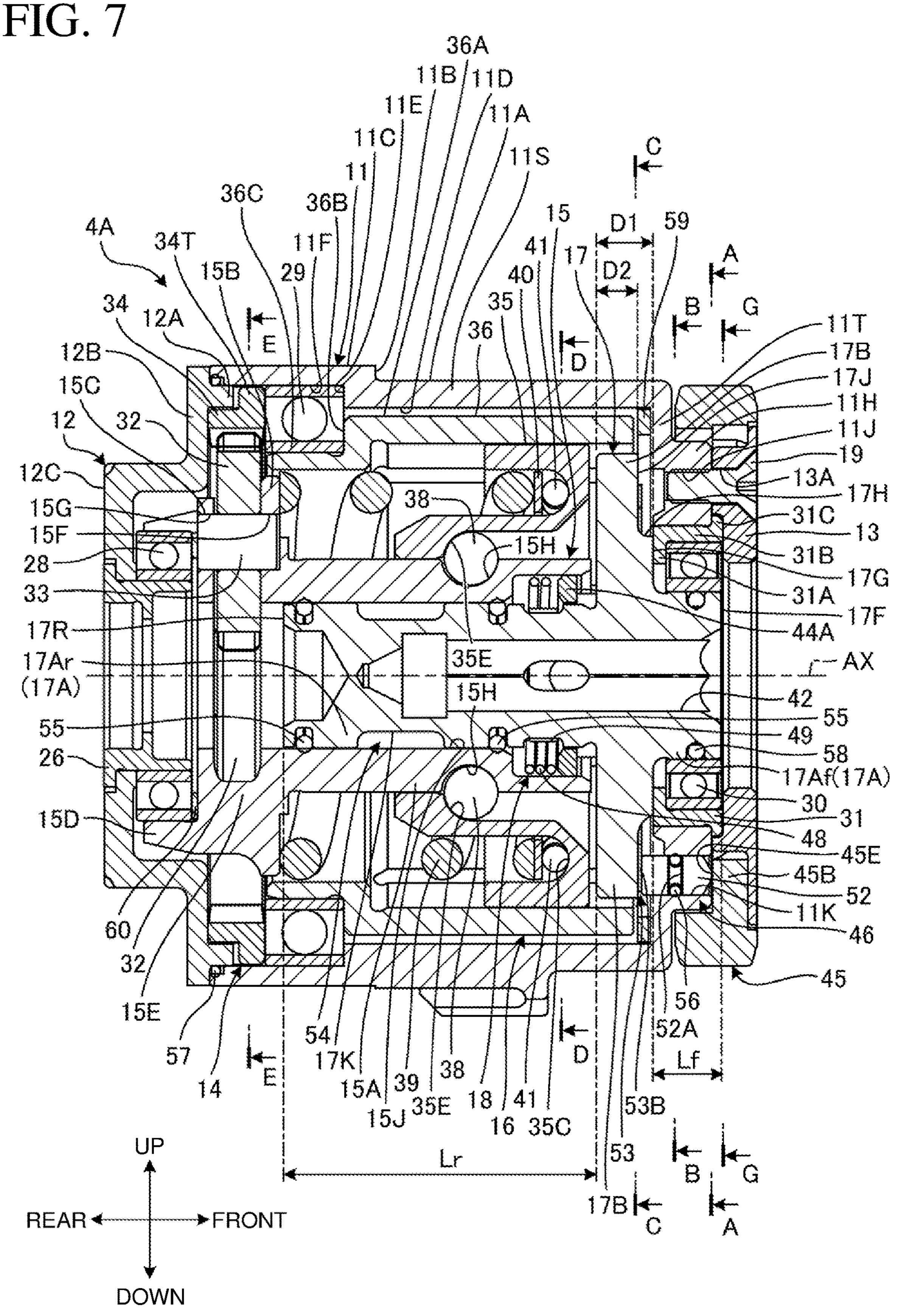
FIG. 7 is a longitudinal sectional view of the body assembly in the first embodiment taken along line L-L in FIG. 6 as viewed in the direction indicated by arrows.
Figure 8:
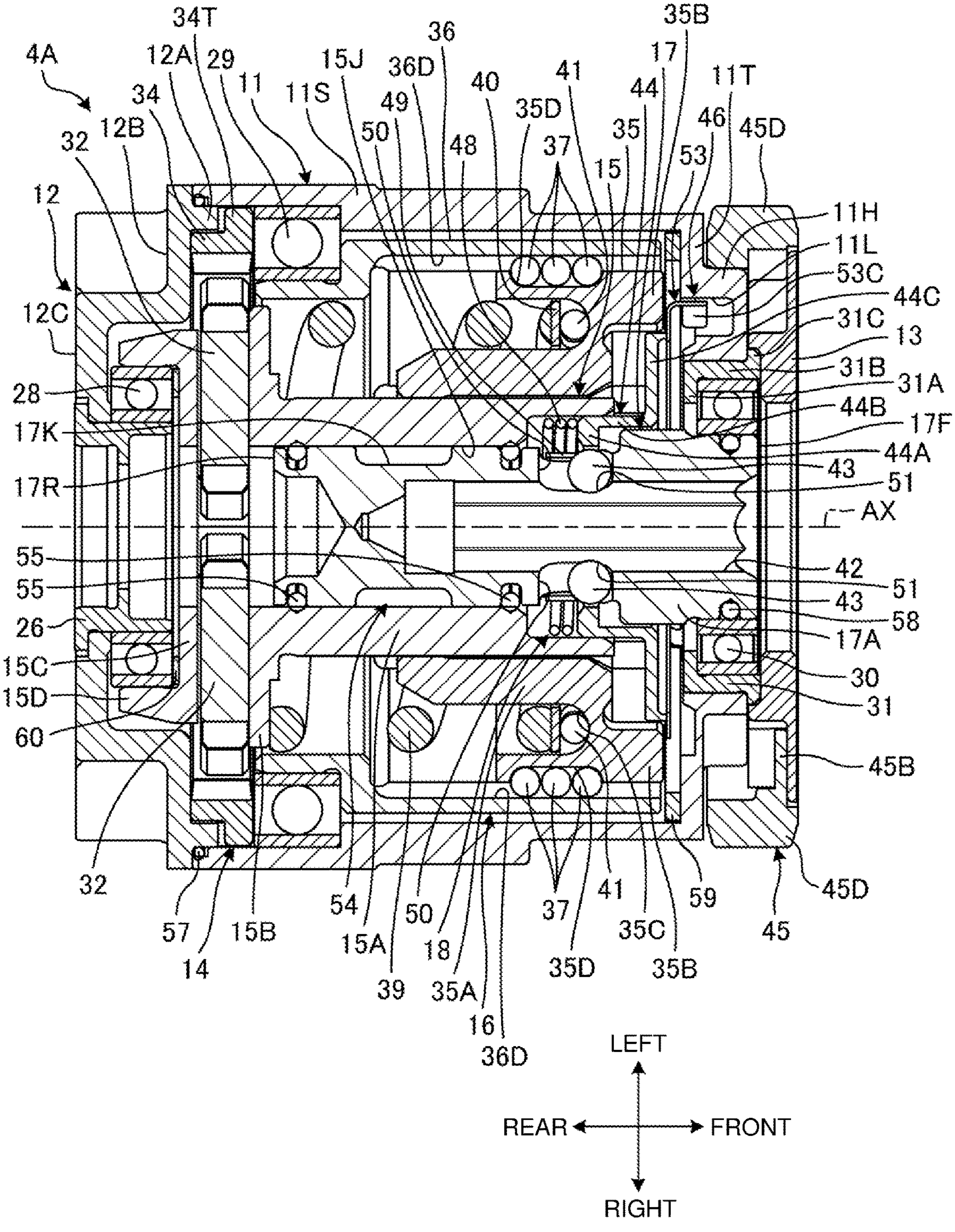
FIG. 8 is a horizontal sectional view of the body assembly in the first embodiment taken along line T-T in FIG. 6 as viewed in the direction indicated by arrows.
Figure 9:
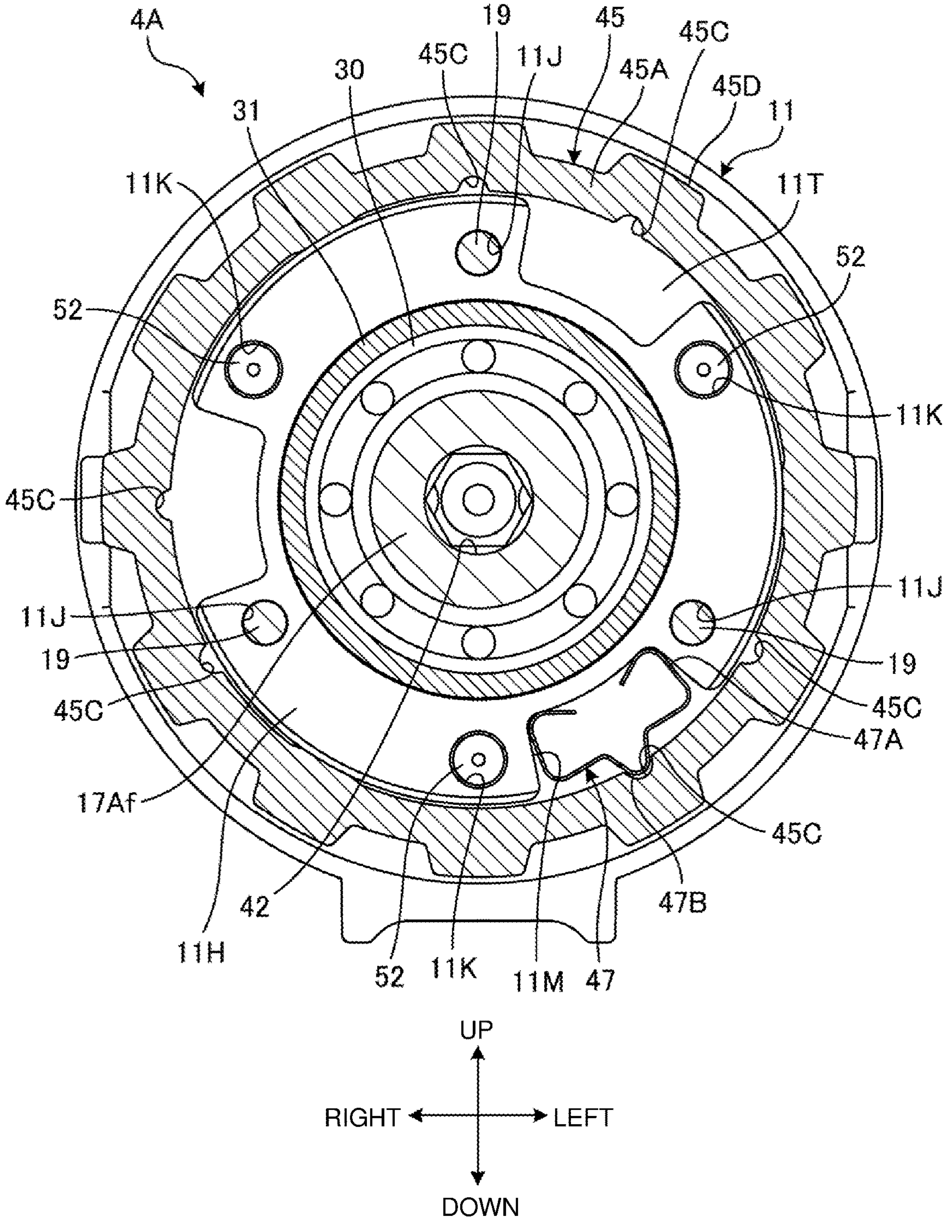
FIG. 9 is a sectional view of the body assembly in the first embodiment taken along line A-A in FIG. 7 as viewed in the direction indicated by arrows.
Figure 10:
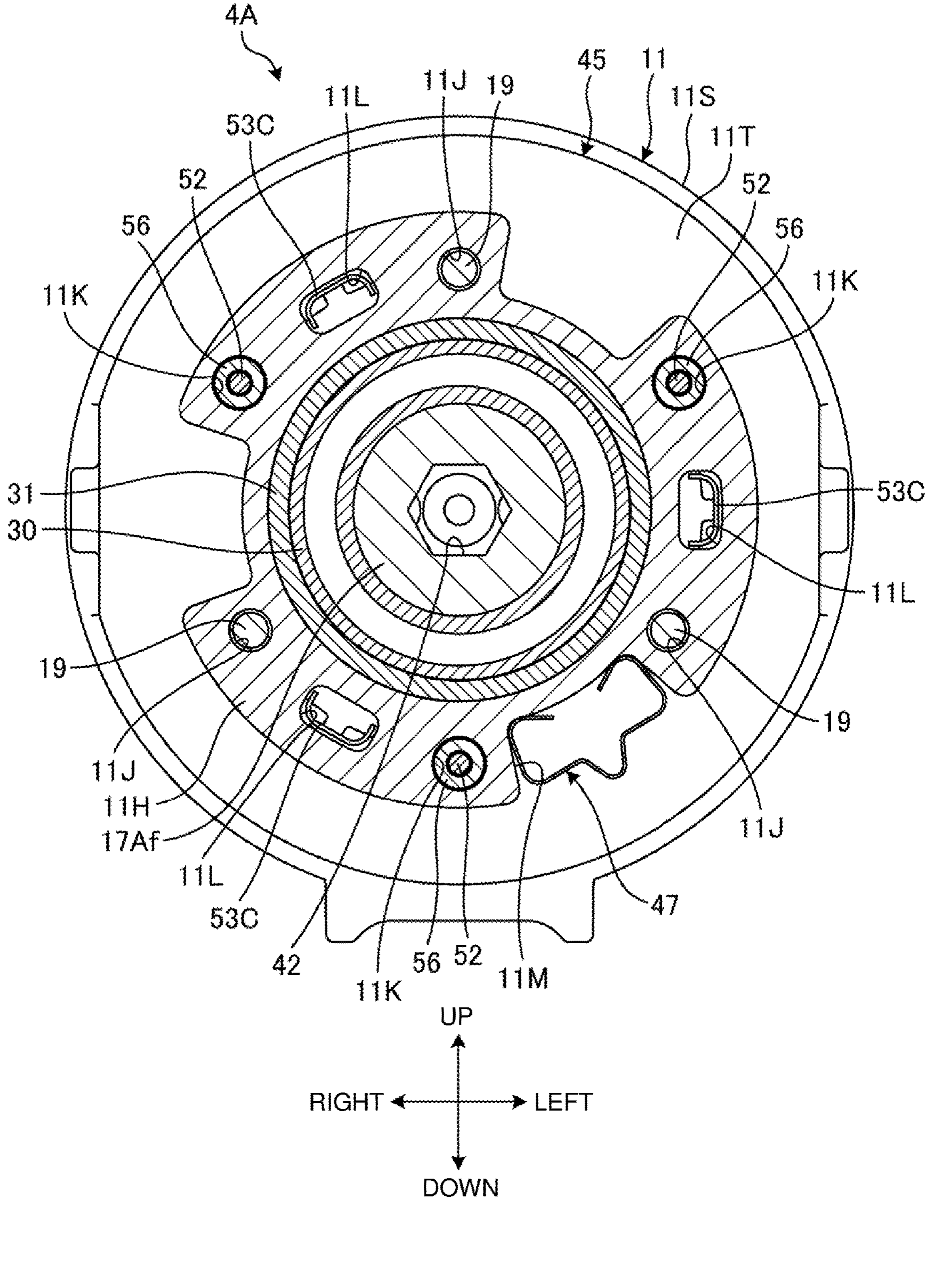
FIG. 10 is a sectional view of the body assembly in the first embodiment taken along line B-B in FIG. 7 as viewed in the direction indicated by arrows.
Figure 11:
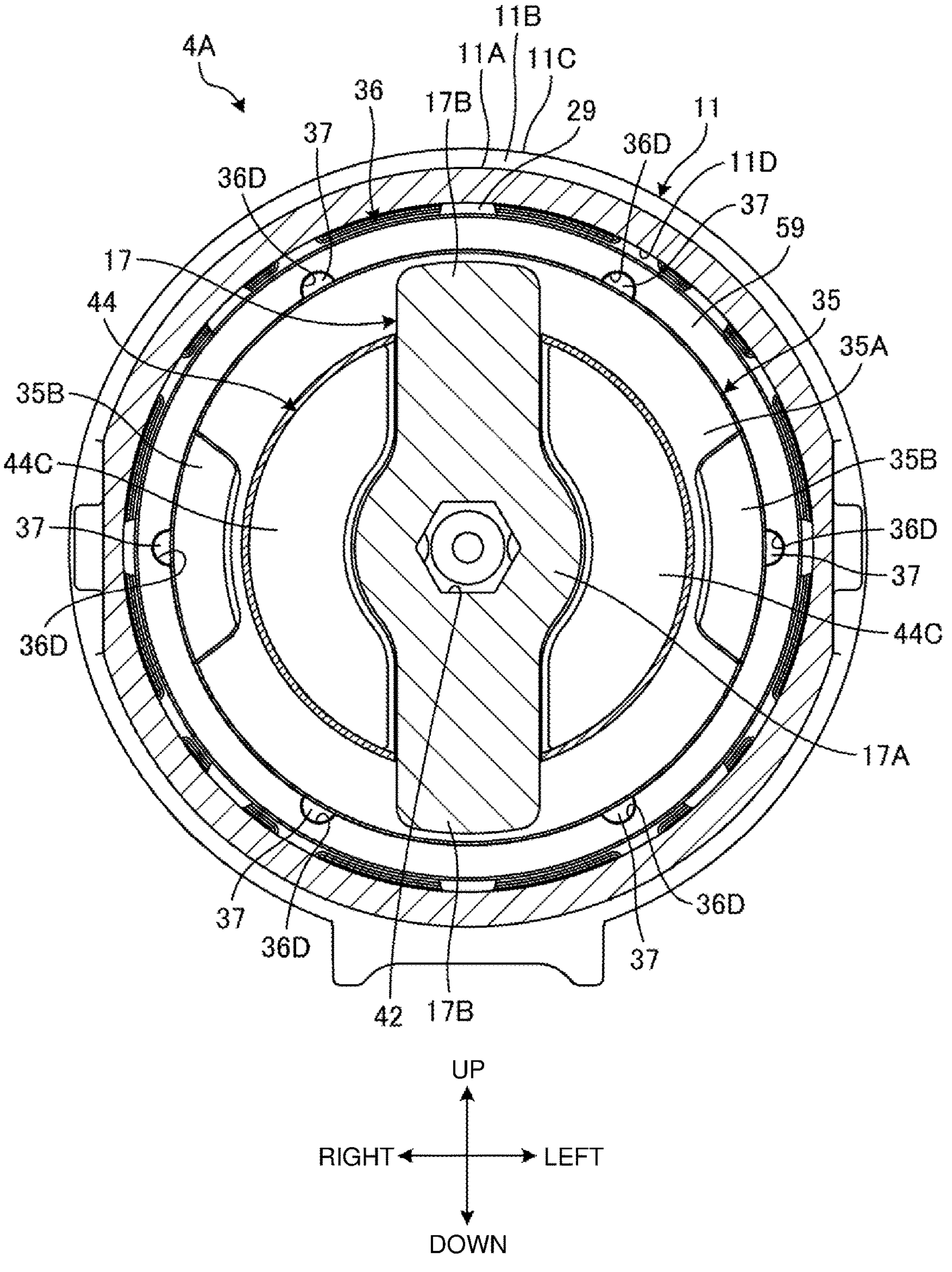
FIG. 11 is a sectional view of the body assembly in the first embodiment taken along line C-C in FIG. 7 as viewed in the direction indicated by arrows.
Figure 12:
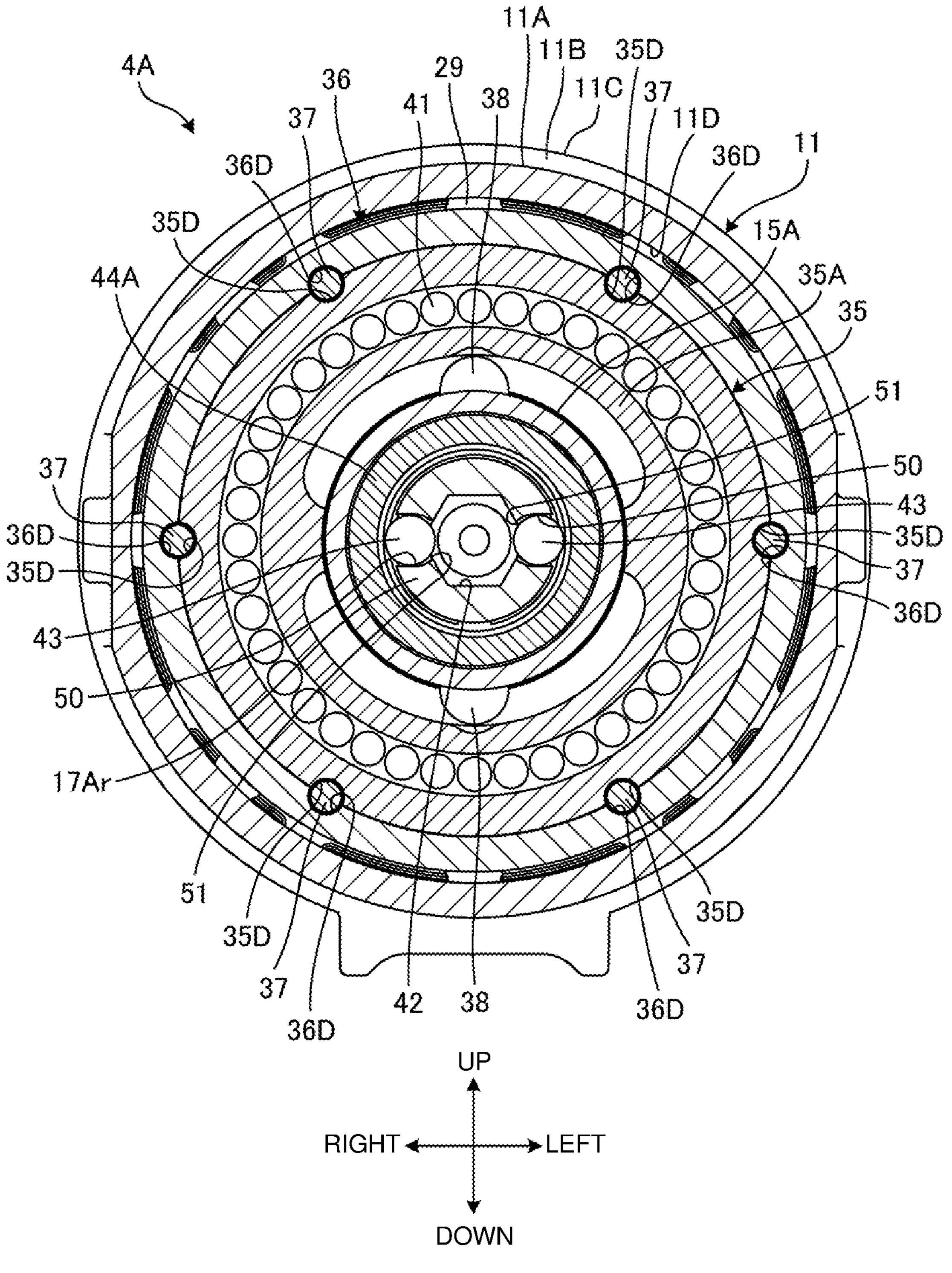
FIG. 12 is a sectional view of the body assembly in the first embodiment taken along line D-D in FIG. 7 as viewed in the direction indicated by arrows.
Figure 13:
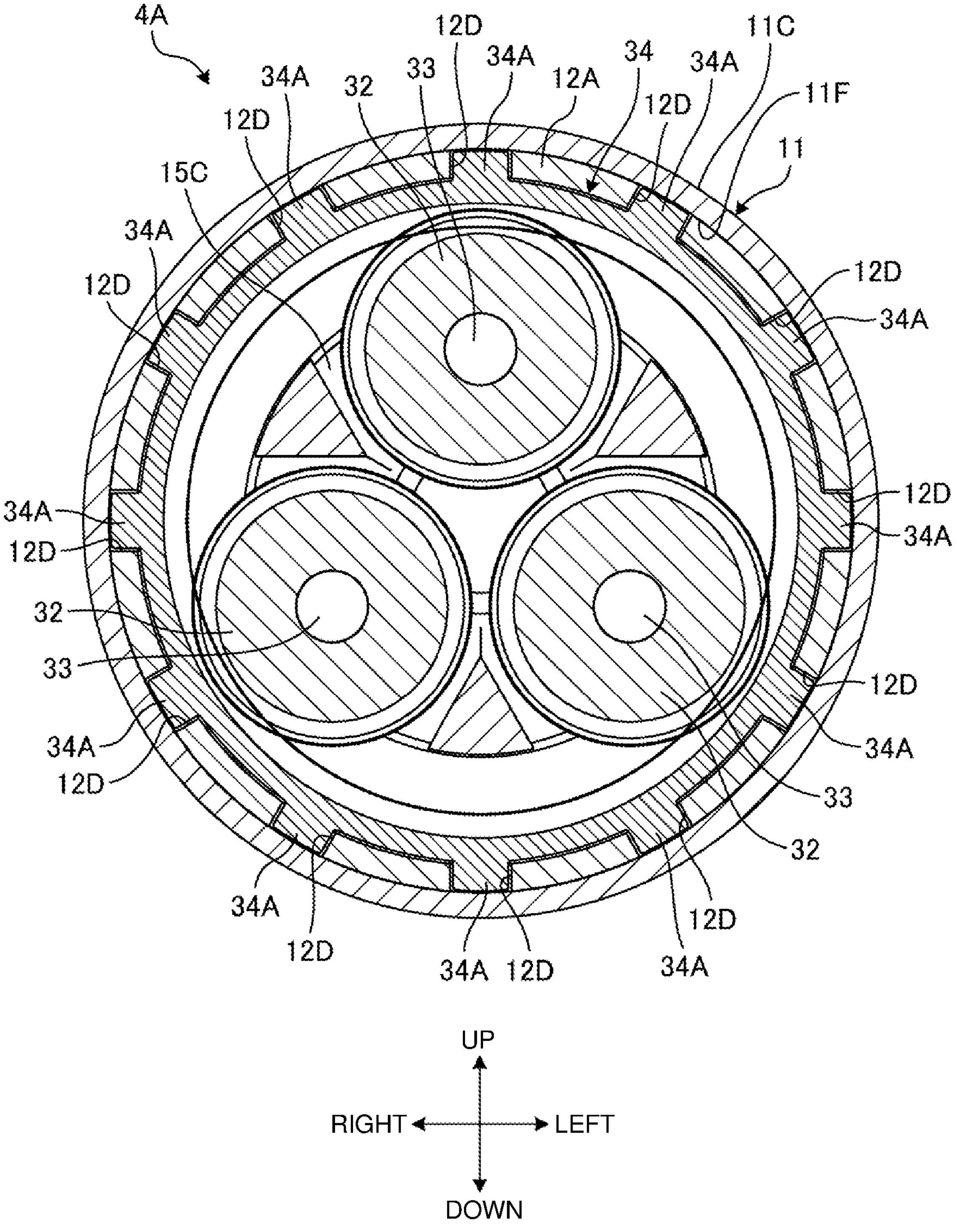
FIG. 13 is a sectional view of the body assembly in the first embodiment taken along line E-E in FIG. 7 as viewed in the direction indicated by arrows.
Figure 14:
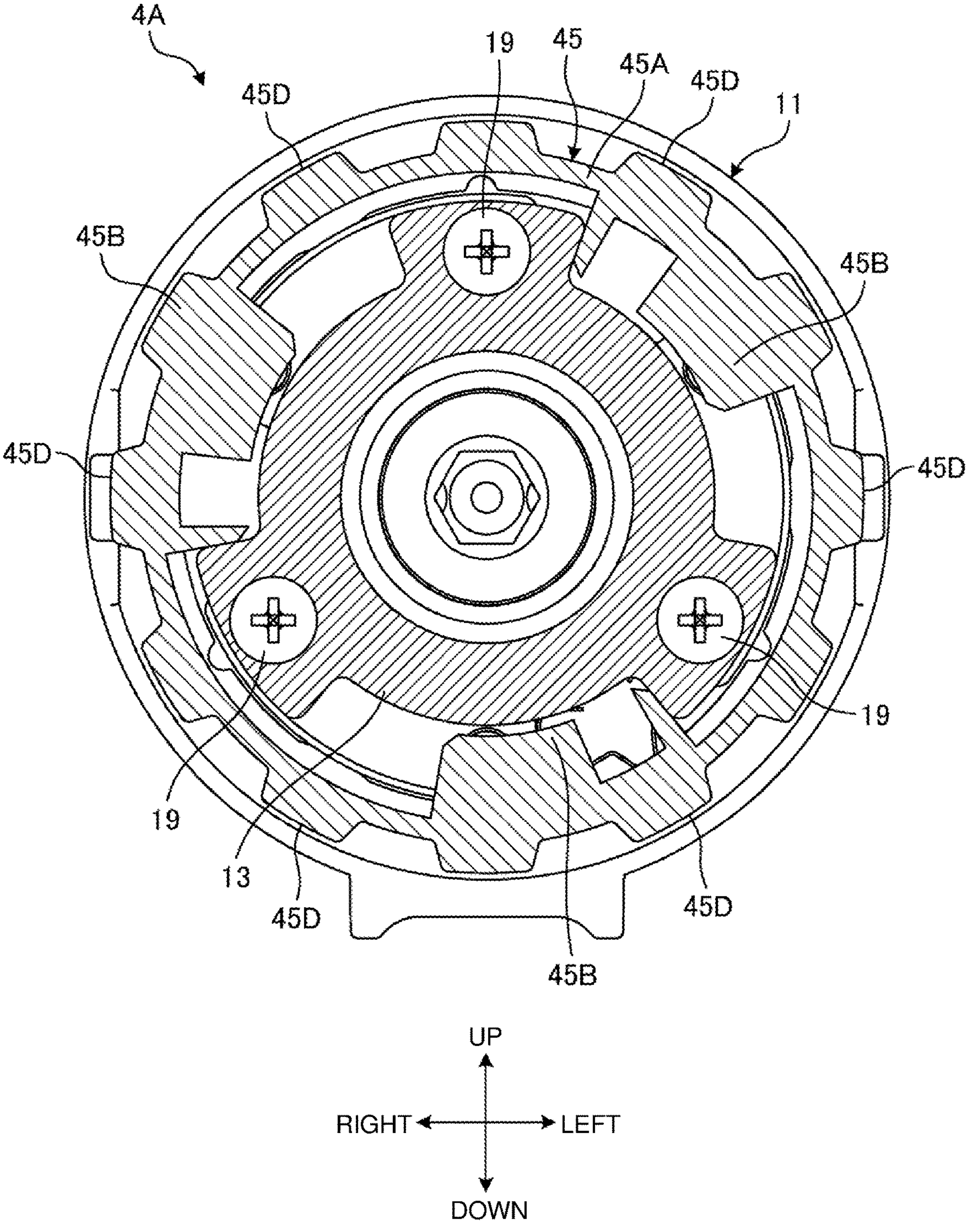
FIG. 14 is a sectional view of the body assembly in the first embodiment taken along line G-G in FIG. 7 as viewed in the direction indicated by arrows.
Figure 15:
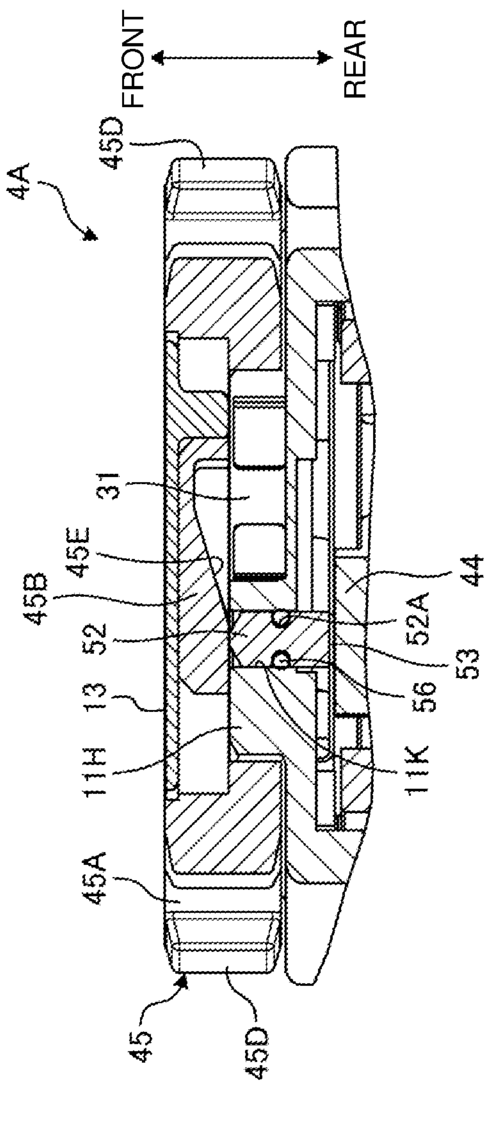
FIG. 15 is a sectional view of the body assembly in the first embodiment taken along line F-F in FIG. 6 as viewed in the direction indicated by arrows.
Figure 16:
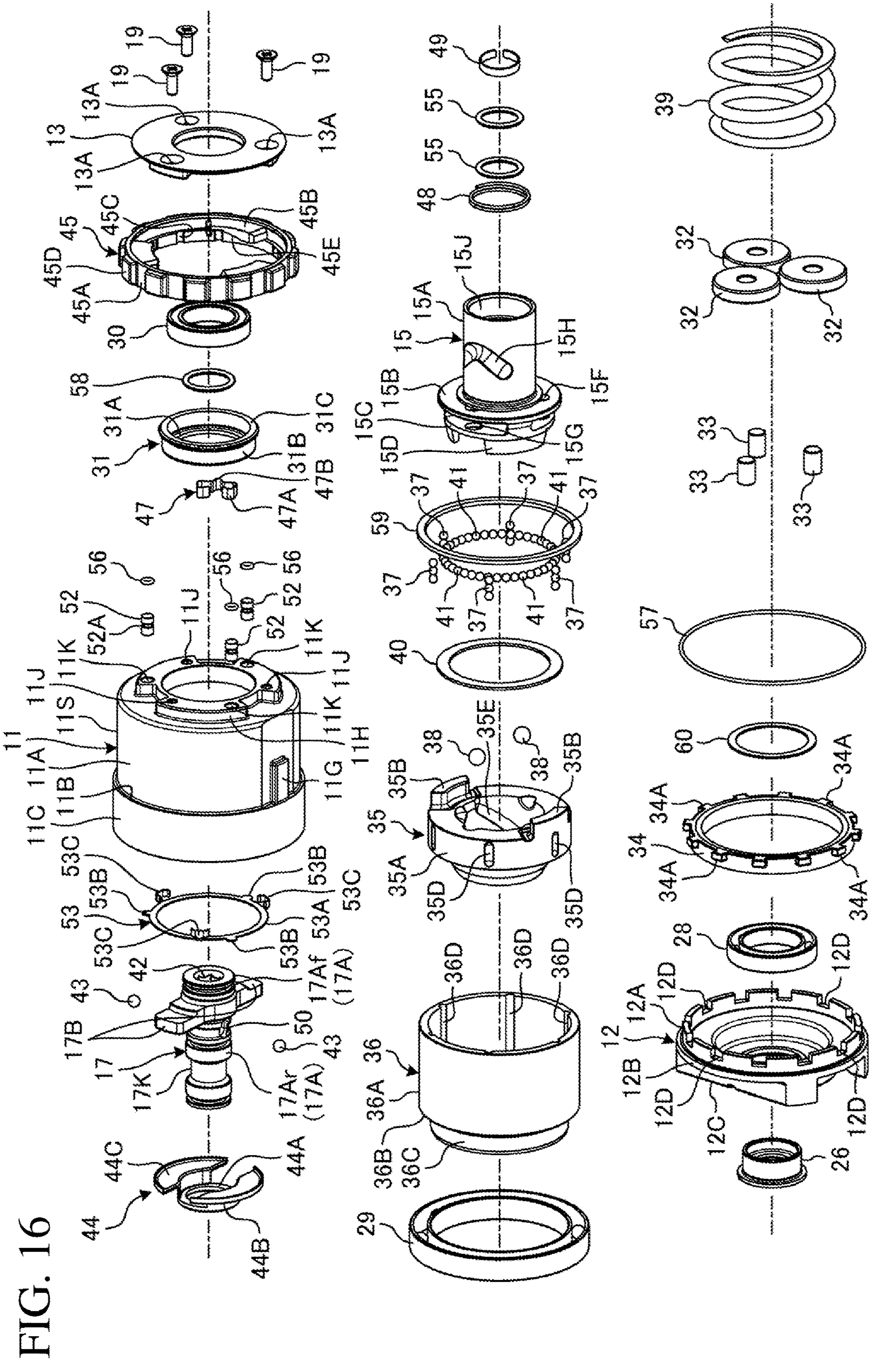
FIG. 16 is an exploded perspective view of the body assembly in the first embodiment.

FIG. 5 is a side view of the body assembly 4A in the present embodiment. FIG. 6 is a front view of the body assembly 4A in the present embodiment. FIG. 7 is a longitudinal sectional view of the body assembly 4A in the present embodiment taken along line L-L in FIG. 6 as viewed in the direction indicated by arrows. FIG. 8 is a horizontal sectional view of the body assembly 4A in the present embodiment taken along line T-T in FIG. 6 as viewed in the direction indicated by arrows. FIG. 9 is a sectional view of the body assembly 4A in the present embodiment taken along line A-A in FIG. 7 as viewed in the direction indicated by arrows. FIG. 10 is a sectional view of the body assembly 4A in the present embodiment taken along line B-B in FIG. 7 as viewed in the direction indicated by arrows. FIG. 11 is a sectional view of the body assembly 4A in the present embodiment taken along line C-C in FIG. 7 as viewed in the direction indicated by arrows. FIG. 12 is a sectional view of the body assembly 4A in the present embodiment taken along line D-D in FIG. 7 as viewed in the direction indicated by arrows. FIG. 13 is a sectional view of the body assembly 4A in the present embodiment taken along line E-E in FIG. 7 as viewed in the direction indicated by arrows. FIG. 14 is a sectional view of the body assembly 4A in the present embodiment taken along line G-G in FIG. 7 as viewed in the direction indicated by arrows. FIG. 15 is a sectional view of the body assembly 4A in the present embodiment taken along line F-F in FIG. 6 as viewed in the direction indicated by arrows. FIG. 16 is an exploded perspective view of the body assembly 4A in the present embodiment.

The body assembly 4A includes the hammer case 11, the gear case 12, the front cover 13, the reducer 14, the spindle 15, the striker 16, the anvil 17, the tool holder 18, a spindle bearing 28, a hammer bearing 29, an anvil bearing 30, the bearing holder 26, and a bearing holder 31.

The rotor 22, the spindle 15, and the anvil 17 are each rotatable about the rotation axis AX. The rotor 22, the spindle 15, and the anvil 17 have their rotation axes aligned with one another. The spindle 15 and the anvil 17 are each rotated with a rotational force generated by the motor 6.

Hammer Case

The hammer case 11 includes a cylinder 11S, a front plate 11T, and a boss 11H. The cylinder 11S surrounds the rotation axis AX. The front plate 11T is connected to the front end of the cylinder 11S. The front plate 11T has an opening at its center. The boss 11H is located on the front surface of the front plate 11T. The boss 11H protrudes frontward from the front surface of the front plate 11T. The boss 11H surrounds the opening in the front plate 11T.

The cylinder 11S has an outer surface including a smaller-outer-diameter surface 11A, a step surface 11B, and a larger-outer-diameter surface 11C. The larger-outer-diameter surface 11C is located rearward from the smaller-outer-diameter surface 11A. The step surface 11B faces frontward. The larger-outer-diameter surface 11C is connected to the smaller-outer-diameter surface 11A with the step surface 11B in between. The smaller-outer-diameter surface 11A has a smaller outer diameter than the larger-outer-diameter surface 11C.

The motor compartment 2A has an inner surface connected to a part of each of the larger-outer-diameter surface 11C, the step surface 11B, and the smaller-outer-diameter surface 11A. The smaller-outer-diameter surface 11A includes a portion with a protrusion 11G. The protrusion 11G protrudes radially outward from the smaller-outer-diameter surface 11A. The protrusion 11G is received in a recess on the inner surface of the motor compartment 2A. This restricts relative rotation between the motor compartment 2A and the hammer case 11.

The cylinder 11S has an inner surface including a smaller-inner-diameter surface 11D, a step surface 11E, and a larger-inner-diameter surface 11F. The larger-inner-diameter surface 11F is located rearward from the smaller-inner-diameter surface 11D. The step surface 11E faces rearward. The larger-inner-diameter surface 11F is connected to the smaller-inner-diameter surface 11D with the step surface 11E in between. The smaller-inner-diameter surface 11D has a smaller inner diameter than the larger-inner-diameter surface 11F.

The gear case 12 is fixed to the rear end of the hammer case 11. The gear case 12 includes a ring 12A, a rear plate 12B, and a protrusion 12C. The ring 12A surrounds the rotation axis AX. The rear plate 12B is connected to the rear end of the ring 12A. An O-ring 57 is located at the boundary between the periphery of the rear plate 12B and the rear end of the hammer case 11. The rear plate 12B has an opening at its center. The protrusion 12C is located on the rear surface of the rear plate 12B. The protrusion 12C protrudes rearward from the rear surface of the rear plate 12B. The protrusion 12C surrounds the opening in the rear plate 12B. The rear plate 12B and the protrusion 12C are connected to the motor compartment 2A.

The ring 12A has recesses 12D at the front end. The recesses 12D are recessed rearward from the front end of the ring 12A. The multiple recesses 12D are located at intervals in the circumferential direction.

The front cover 13 is fastened to the front end of the hammer case 11 with the three screws 19. The front cover 13 has an opening at its center. The front cover 13 has through-holes 13A to receive the screws 19. The boss 11H on the hammer case 11 has threaded holes 11J to receive the screws 19. The screws 19 received in the through-holes 13A are received in the threaded holes 11J and have their threads engaged with threaded grooves on the threaded holes 11J. The front cover 13 is thus fastened to the front end of the hammer case 11.

The bearing holder 26 is fixed to the gear case 12. The bearing holder 26 is received in the opening at the center of the gear case 12. The bearing holder 26 holds the rotor bearing 25 and the spindle bearing 28. As shown in FIG. 4, the rotor bearing 25 is located radially inward from the bearing holder 26. The spindle bearing 28 is located radially outward from the bearing holder 26.

The gear case 12 is formed from a synthetic resin. This reduces the weight of the body assembly 4A. The bearing holder 26 is formed from metal such as iron. This reduces a decrease in rigidity of the body assembly 4A. The rotor bearing 25 and the spindle bearing 28 are held by the rigid bearing holder 26.

Reducer

The reducer 14 connects the rotor shaft 22B and the spindle 15. The reducer 14 transmits rotation of the rotor 22 to the spindle 15. The reducer 14 causes the spindle 15 to rotate at a lower rotational speed than the rotor shaft 22B. The reducer 14 includes a planetary gear assembly.

The reducer 14 includes multiple planetary gears 32, pins 33, and an internal gear 34. The multiple planetary gears 32 surround the pinion gear 27. Each pin 33 holds the corresponding planetary gear 32. The internal gear 34 surrounds the multiple planetary gears 32. Each planetary gear 32 meshes with the pinion gear 27. The planetary gears 32 are rotatably supported by the spindle 15 with the pins 33. The spindle 15 is rotated by the planetary gears 32. The internal gear 34 includes internal teeth that mesh with the planetary gears 32.

The internal gear 34 is fixed to each of the hammer case 11 and the gear case 12. The internal gear 34 includes protrusions 34A on its outer surface. The protrusions 34A protrude radially outward from the outer surface of the internal gear 34. The multiple protrusions 34A are located at intervals in the circumferential direction. The protrusions 34A are received in the recesses 12D on the gear case 12. This restricts relative rotation between the gear case 12 and the internal gear 34. The internal gear 34 is constantly nonrotatable relative to the hammer case 11.

With the protrusions 34A being received in the recesses 12D, the ring 12A has a front end face located frontward from the front end face of the internal gear 34.

When the rotor shaft 22B rotates as driven by the motor 6, the pinion gear 27 rotates, and the planetary gears 32 revolve about the pinion gear 27. The planetary gears 32 meshing with the internal teeth on the internal gear 34 revolve. This causes the spindle 15 connected to the planetary gears 32 with the pins 33 to rotate at a lower rotational speed than the rotor shaft 22B.

Spindle

The spindle 15 is at least partly located frontward from the reducer 14. The spindle 15 is rotated by the rotor 22 of the motor 6. The spindle 15 rotates with a rotational force from the rotor 22 transmitted by the reducer 14. The spindle 15 transmits the rotational force from the motor 6 to the anvil 17 through the striker 16.

The spindle 15 includes a spindle shaft 15A, a flange 15B, a pin support 15C, and a bearing retainer 15D. The spindle shaft 15A extends in the axial direction. The spindle shaft 15A is cylindrical. The spindle shaft 15A surrounds the rotation axis AX. The flange 15B is located on a rear portion of the spindle shaft 15A. The flange 15B protrudes radially outward from the rear portion of the spindle shaft 15A. The pin support 15C is located rearward from the flange 15B. The pin support 15C is annular. The flange 15B includes a portion connected to a portion of the pin support 15C with a connection portion 15E. The bearing retainer 15D protrudes rearward from the pin support 15C.

The planetary gears 32 are between the flange 15B and the pin support 15C. The pins 33 have the front ends received in support holes 15F in the flange 15B. The pins 33 have the rear ends received in support holes 15G in the pin support 15C. The planetary gears 32 are rotatably supported by each of the flange 15B and the pin support 15C with the pins 33.

The bearing retainer 15D surrounds the spindle bearing 28. The spindle 15 is rotatably supported by the spindle bearing 28. A washer 60 is at a position facing the front end of an outer ring of the spindle bearing 28.

Striker

The striker 16 is driven by the motor 6. A rotational force from the motor 6 is transmitted to the striker 16 through the reducer 14 and the spindle 15. The striker 16 strikes the anvil 17 in the rotation direction in response to the rotational force from the spindle 15 rotated by the motor 6.

The striker 16 includes an inner hammer 35, an outer hammer 36, connectors 37, balls 38, a coil spring 39, a washer 40, and balls 41.

The inner hammer 35 strikes the anvil 17 in the rotation direction. The inner hammer 35 is supported by the spindle 15. The inner hammer 35 surrounds the spindle shaft 15A. The inner hammer 35 is located frontward from the reducer 14.

The inner hammer 35 includes a hammer body 35A and hammer projections 35B. The hammer body 35A is cylindrical. The hammer body 35A surrounds the spindle shaft 15A. The hammer projections 35B are located on a front portion of the hammer body 35A. The hammer projections 35B protrude frontward from the front portion of the hammer body 35A. Two hammer projections 35B are located about the rotation axis AX. An annular recess 35C is located on the rear surface of the hammer body 35A. The recess 35C is recessed frontward from the rear surface of the hammer body 35A.

The outer hammer 36 surrounds the inner hammer 35. The outer hammer 36 is cylindrical. The outer hammer 36 surrounds the rotation axis AX. A washer 59 is at a position facing the front end of the outer hammer 36 inside the hammer case 11.

The outer hammer 36 has an outer surface including a larger-outer-diameter surface 36A, a step surface 36B, and a smaller-outer-diameter surface 36C. The smaller-outer-diameter surface 36C is located rearward from the larger-outer-diameter surface 36A. The step surface 36B faces rearward. The smaller-outer-diameter surface 36C is connected to the larger-outer-diameter surface 36A with the step surface 36B in between. The larger-outer-diameter surface 36A has a larger outer diameter than the smaller-outer-diameter surface 36C.

The connectors 37 connect the inner hammer 35 and the outer hammer 36. The connectors 37 include multiple balls between the inner hammer 35 and the outer hammer 36. The hammer body 35A has holding grooves 35D on its outer surface. The holding grooves 35D are elongated in the axial direction. The multiple holding grooves 35D are located at intervals in the circumferential direction. The connectors 37 are received in the holding grooves 35D. Three connectors 37 located in the axial direction are received in each holding groove 35D. The outer hammer 36 has an inner surface having guide grooves 36D to guide the connectors 37 in the axial direction. The guide grooves 36D are elongated in the axial direction. The guide grooves 36D are longer than the holding grooves 35D in the axial direction.

The inner hammer 35 and the outer hammer 36 are movable relative to each other in the axial direction. The inner hammer 35 is movable relative to the outer hammer 36 in the axial direction while being guided along the guide grooves 36D on the outer hammer 36 with the connectors 37 in between.

The balls 38 are between the spindle 15 and the inner hammer 35. The balls 38 are between the spindle shaft 15A and the hammer body 35A. The balls 38 are formed from metal such as steel. The spindle shaft 15A has a spindle groove 15H to receive at least parts of the balls 38. The spindle groove 15H is on the outer surface of the spindle shaft 15A. The hammer body 35A has a hammer groove 35E to receive at least parts of the balls 38. The hammer groove 35E is on the inner surface of the hammer body 35A. The balls 38 are between the spindle groove 15H and the hammer groove 35E. The balls 38 roll along the spindle groove 15H and the hammer groove 35E. The inner hammer 35 is movable together with the balls 38. The spindle 15 and the inner hammer 35 move relative to each other in the axial and rotation directions within a movable range defined by the spindle groove 15H and the hammer groove 35E.

The inner hammer 35 is connected to the spindle 15 with the balls 38 in between. The inner hammer 35 is rotatable together with the spindle 15 in response to the rotational force from the spindle 15 rotated by the motor 6. The inner hammer 35 is rotatable about the rotation axis AX. The spindle 15 and the outer hammer 36 are apart from each other. The outer hammer 36 is connected to the inner hammer 35 with the connectors 37 in between. The outer hammer 36 is rotatable together with the inner hammer 35. The outer hammer 36 is rotatable about the rotation axis AX.

The washer 40 is received in the recess 35C. The balls 41 are located frontward from the washer 40. The multiple balls 41 surround the rotation axis AX. The washer 40 is supported by the inner hammer 35 with the multiple balls 41 in between.

The coil spring 39 surrounds the spindle shaft 15A. The coil spring 39 has the rear end supported by the flange 15B. The coil spring 39 has the front end received in the recess 35C and supported by the washer 40. The coil spring 39 constantly generates an elastic force for moving the inner hammer 35 forward.

The hammer bearing 29 supports the outer hammer 36 in a rotatable manner. The hammer bearing 29 is held in the hammer case 11. The hammer bearing 29 surrounds the smaller-outer-diameter surface 36C of the outer hammer 36.

The hammer bearing 29 has a front end face in contact with the step surface 36B of the outer hammer 36 and in contact with the step surface 11E of the hammer case 11. With the protrusions 34A being received in the recesses 12D, the ring 12A has the front end face located frontward from the front end face of the internal gear 34. The ring 12A in the gear case 12 has the front end face in contact with the rear end face of the hammer bearing 29. The hammer bearing 29 is sandwiched between the step surfaces 36B and 11E and the ring 12A in the front-rear direction. The hammer bearing 29 is thus positioned in the axial direction. The hammer bearing 29 has an outer surface in contact with the larger-inner-diameter surface 11F of the hammer case 11. The hammer bearing 29 is thus positioned in the radial direction. The hammer bearing 29 has an outer surface in contact with the larger-inner-diameter surface 11F of the hammer case 11, and thus has its outer ring positioned in the circumferential direction.

Anvil

The anvil 17 is strikable by the inner hammer 35 in the rotation direction. The anvil 17 is located frontward from the motor 6. The anvil 17 serves as an output shaft of the power tool 1 that rotates in response to the rotational force from the rotor 22. The anvil 17 is at least partly located frontward from the spindle 15. The anvil 17 is at least partly located frontward from the inner hammer 35. The anvil 17 has an insertion hole 42 to receive a tip tool. The insertion hole 42 extends rearward from the front end of the anvil 17. The tip tool is attached to the anvil 17.

The anvil 17 includes an anvil shaft 17A and anvil projections 17B. The anvil shaft 17A extends in the axial direction. The insertion hole 42 is located in the anvil shaft 17A. The insertion hole 42 extends rearward from the front end of the anvil shaft 17A. The tip tool is attached to the anvil shaft 17A. The anvil projections 17B are located in a front portion of the anvil 17. The anvil projections 17B protrude radially outward from a front portion of the anvil shaft 17A. The anvil projections 17B are strikable by the hammer projections 35B on the inner hammer 35 in the rotation direction.

The anvil shaft 17A includes a rear shaft portion 17Ar and a front shaft portion 17Af. The rear shaft portion 17Ar is located rearward from the anvil projections 17B. The front shaft portion 17Af is located frontward from the anvil projections 17B. The rear shaft portion 17Ar has a length Lr, and the front shaft portion 17Af has a length Lf. The length Lr is longer than the length Lf in the axial direction.

The anvil 17 is connected to the spindle 15. The spindle shaft 15A has a support hole 15J to receive the anvil 17. The support hole 15J extends rearward from the front end of the spindle shaft 15A. The rear shaft portion 17Ar of the anvil shaft 17A is received in the support hole 15J.

The rear shaft portion 17Ar has a groove 17K on its outer circumferential surface. The groove 17K and the spindle shaft 15A define a space 54 between them to be filled with lubricating oil. The lubricating oil includes grease. The lubricating oil is supplied to between the inner surface of the spindle shaft 15A and the outer surface of the rear shaft portion 17Ar. O-rings 55 are located at the boundary between the inner surface of the spindle shaft 15A and the outer surface of the rear shaft portion 17Ar. The O-rings 55 are located at the front and rear of the space 54.

The anvil 17 has a rear end 17R located rearward from the balls 38. The insertion hole 42 has the rear end located rearward from the balls 38.

The anvil bearing 30 supports the anvil 17 in a rotatable manner. The anvil bearing 30 supports the anvil shaft 17A in a rotatable manner. The anvil bearing 30 surrounds the front shaft portion 17Af. The anvil bearing 30 supports the front shaft portion 17Af in a rotatable manner. An O-ring 58 is located at the boundary between the front shaft portion 17Af and the anvil bearing 30.

The anvil 17 has a front end 17F located rearward from the front surface of the front cover 13. The anvil 17 has the front end 17F located rearward from the front end face of the anvil bearing 30. The anvil 17 may have the front end 17F at the same position as the front end face of the anvil bearing 30 in the axial direction. The anvil 17 may have the front end 17F located frontward from the front end face of the anvil bearing 30.

The bearing holder 31 holds the anvil bearing 30. The bearing holder 31 at least partly faces the front surfaces of the anvil projections 17B. The bearing holder 31 is in contact with at least a part of the anvil bearing 30. The bearing holder 31 is a ring member. The bearing holder 31 is received in the opening in the front plate 11T of the hammer case 11. The bearing holder 31 is fixed to the front end of the hammer case 11. The hammer case 11 holds the anvil bearing 30 with the bearing holder 31.

The bearing holder 31 includes a first portion 31A, a second portion 31B, and a third portion 31C. The first portion 31A is located rearward from the anvil bearing 30. The first portion 31A faces the rear end face of the anvil bearing 30. The first portion 31A is in contact with the rear end face of the anvil bearing 30. The second portion 31B extends frontward from the outer edge of the first portion 31A. The second portion 31B is located radially outward from the outer surface of the anvil bearing 30. The second portion 31B faces the outer surface of the anvil bearing 30. The second portion 31B is in contact with the outer surface of the anvil bearing 30. The third portion 31C extends radially outward from the front end of the second portion 31B. The third portion 31C faces the front surface of the boss 11H. The third portion 31C is in contact with the front surface of the boss 11H.

Each anvil projection 17B has a front surface including a first surface 17G, a step surface 17H, and a second surface 17J. The second surface 17J is located rearward from the first surface 17G. The second surface 17J is located radially outward from the first surface 17G. The step surface 17H faces radially outward. The second surface 17J is connected to the first surface 17G with the step surface 17H in between.

The first surface 17G is in contact with at least a part of the bearing holder 31. The second surface 17J is apart from the bearing holder 31. The first surface 17G is in contact with the rear surface of the first portion 31A of the bearing holder 31. The anvil 17 rotates with the first surface 17G being in contact with the rear surface of the first portion 31A.

Each anvil projection 17B has a flat rear surface. A distance D2 between the second surface 17J and the rear surface of the anvil projection 17B is shorter than a distance D1 between the first surface 17G and the rear surface of the anvil projection 17B in the axial direction. In other words, the anvil projection 17B is thinner at the second surface 17J than at the first surface 17G.

The hammer projections 35B on the inner hammer 35 can come in contact with the anvil projections 17B on the anvil 17. When the motor 6 operates in this contact state, the inner hammer 35 and the spindle 15 rotate together.

The anvil 17 is strikable by the inner hammer 35 in the rotation direction. When, for example, the anvil 17 receives a higher load in a screwing operation, the anvil 17 may fail to rotate with the load from the coil spring 39 alone. This stops rotation of the anvil 17 and the inner hammer 35. The spindle 15 and the inner hammer 35 are movable relative to each other in the axial and circumferential directions with the balls 38 in between. When the inner hammer 35 stops rotating, the spindle 15 continues to rotate with power generated by the motor 6. When the inner hammer 35 stops rotating and the spindle 15 rotates, the balls 38 move backward while being guided along the spindle groove 15H and the hammer groove 35E. The inner hammer 35 receives a force from the balls 38 to move backward with the balls 38. In other words, the inner hammer 35 moves backward when the anvil 17 stops rotating and the spindle 15 rotates. The inner hammer 35 thus comes out of contact with the anvil projections 17B.

The coil spring 39 constantly generates an elastic force for moving the inner hammer 35 forward. The inner hammer 35 that has moved backward then moves forward under the elastic force from the coil spring 39. When moving forward, the inner hammer 35 receives a force in the rotation direction from the balls 38. In other words, the inner hammer 35 moves forward while rotating. The inner hammer 35 then comes in contact with the anvil projections 17B while rotating. Thus, the anvil projections 17B are struck by the hammer projections 35B in the rotation direction. The anvil 17 receives power from the motor 6 and an inertial force from the inner hammer 35. The anvil 17 thus rotates with high torque about the rotation axis AX.

The outer hammer 36 is rotatable together with the inner hammer 35. When the inner hammer 35 strikes the anvil 17 in the rotation direction, the anvil 17 receives a rotational inertial force from the inner hammer 35, together with a rotational inertial force from the outer hammer 36. The anvil 17 is thus struck in the rotation direction with a high striking force.

Although being rotatable together with the inner hammer 35, the outer hammer 36 is immovable relative to the spindle 15 or the hammer case 11 in the axial direction. In other words, the outer hammer 36 is immovable in the front-rear direction when the inner hammer 35 moves relative to the spindle 15 in the front-rear direction. This reduces vibrations of the body assembly 4A in the front-rear direction.

Tool Holder

Figure 17:
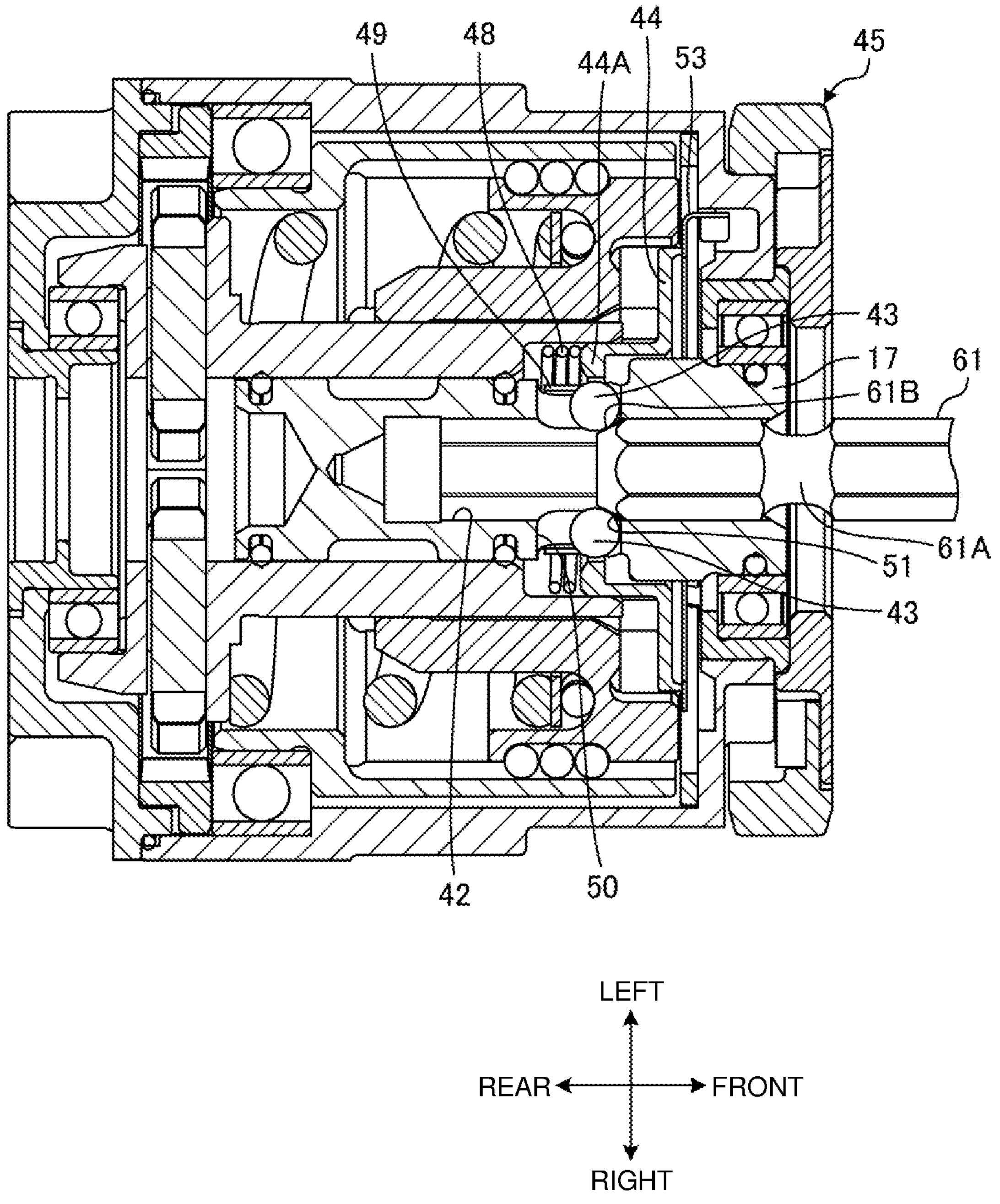
FIG. 17 is a view of a tool holder in the first embodiment describing its operation.

FIG. 17 is a view describing the operation of the tool holder 18 in the present embodiment. The tool holder 18 removably holds a tip tool 61 received in the insertion hole 42 in the anvil 17.

The tool holder 18 includes locking members 43, a bit sleeve 44, an operable member 45, a transmission 46, a positioner 47, a sleeve spring 48, and an elastic ring 49.

The locking members 43 are supported by the anvil 17. The locking members 43 are supported by the anvil shaft 17A. The locking members 43 are supported by the rear shaft portion 17Ar.

The anvil 17 has support recesses 50 to support the locking members 43. The support recesses 50 are located on the outer surface of the rear shaft portion 17Ar. In the present embodiment, the anvil shaft 17A has two support recesses 50.

The locking members 43 are balls. The locking members 43 are received in the support recesses 50. Each locking member 43 is received in the corresponding support recess 50. The locking members 43 are accommodated in the hammer case 11. The locking members 43 are located rearward from the anvil bearing 30. The locking members 43 overlap the inner hammer 35 in the axial direction. The locking members 43 overlap the outer hammer 36 in the axial direction.

The rear shaft portion 17Ar has through-holes 51 connecting the inner surfaces of the support recesses 50 to the inner surface of the insertion hole 42. Each locking member 43 has a smaller diameter than each through-hole 51. The locking members 43 supported in the support recesses 50 are at least partly located inside the insertion hole 42 through the through-holes 51. The locking members 43 fasten a tip tool received in the insertion hole 42. The locking members 43 are at least partly receivable in a groove 61A on the side surface of the tip tool 61 through the through-holes 51 to lock the tip tool 61.

The locking members 43 are movable in the support recesses 50. The locking members 43 are movable to a locking position and an unlocking position. At the locking position, the locking members 43 lock the tip tool 61 received in the insertion hole 42. At the unlocking position, the locking members 43 unlock the tip tool 61. The locking position includes a position at which the locking members 43 are at least partly received in the groove 61A on the tip tool 61 through the through-holes 51 and located inside the insertion hole 42. The unlocking position includes a position at which the locking members 43 are removed from the groove 61A on the tip tool 61 and located outside the insertion hole 42. The locking members 43 move radially inward in the support recesses 50 to be placed at the locking position. The locking members 43 move radially outward in the support recesses 50 to be placed at the unlocking position.

The bit sleeve 44 surrounds the anvil 17. The bit sleeve 44 is movable to a movement-restricting position and a movement-permitting position. At the movement-restricting position, the bit sleeve 44 surrounding the anvil 17 restricts radially outward movement of the locking members 43. At the movement-permitting position, the bit sleeve 44 permits radially outward movement of the locking members 43. The bit sleeve 44 surrounding the anvil 17 is movable in the axial direction. In the present embodiment, the movement-permitting position is frontward from the movement-restricting position. The bit sleeve 44 surrounding the anvil 17 moves backward to be placed at the movement-restricting position. The bit sleeve 44 surrounding the anvil 17 moves forward to be placed at the movement-permitting position.

The bit sleeve 44 at the movement-restricting position restricts the locking members 43 at the locking position from moving radially outward. In other words, the bit sleeve 44 restricts the locking members 43 from coming out of the locking position. Thus, the tip tool remains fastened by the locking members 43.

The bit sleeve 44 moved to the movement-permitting position permits the locking members 43 to move radially outward from the locking position. In other words, the bit sleeve 44 permits the locking members 43 to come out of the locking position to the unlocking position. This can unfasten the tip tool fastened by the locking members 43.

The bit sleeve 44 includes a contact portion 44A, a cylinder 44B, and an operation portion 44C. The contact portion 44A surrounds the rear shaft portion 17Ar. The contact portion 44A can come in contact with the locking members 43. The contact portion 44A surrounding the rear shaft portion 17Ar is movable to the movement-restricting position and the movement-permitting position. The cylinder 44B is connected to a radially outer edge of the contact portion 44A. The cylinder 44B extends frontward from the outer edge of the contact portion 44A. The operation portion 44C is connected to the front end of the cylinder 44B. The operation portion 44C extends radially outward from the front end of the cylinder 44B.

The bit sleeve 44 is at least partly between the inner hammer 35 and the anvil 17 in the radial direction. The bit sleeve 44 is at least partly between the inner hammer 35 and the rear shaft portion 17Ar in the radial direction. At least the contact portion 44A of the bit sleeve 44 is between the hammer body 35A and the rear shaft portion 17Ar in the radial direction.

The bit sleeve 44 is at least partly between the spindle shaft 15A and the anvil shaft 17A in the radial direction. In the present embodiment, at least the contact portion 44A of the bit sleeve 44 is located inside the spindle shaft 15A. At least the contact portion 44A of the bit sleeve 44 is between the inner surface of the spindle shaft 15A and the outer surface of the rear shaft portion 17Ar in the radial direction.

The bit sleeve 44 is accommodated in the hammer case 11. The bit sleeve is located rearward from the anvil bearing 30.

The operable member 45 is operable by the operator to move the bit sleeve 44. The operable member 45 is located outside the hammer case 11. The operable member 45 is supported by the hammer case 11. The operable member 45 is annular. The operable member 45 is at least partly between the front surface of the hammer case 11 and the rear surface of the front cover 13. The operable member 45 surrounds the boss 11H on the hammer case 11. The operable member 45 is rotatably supported by the boss 11H. The operable member 45 is operable by the operator to rotate in the circumferential direction. The front cover 13 reduces the likelihood that the operable member 45 slips forward from the boss 11H. The operable member 45 is rotated in the circumferential direction to move the bit sleeve 44 in the axial direction. Thus, the bit sleeve 44 is movable to the movement-restricting position and the movement-permitting position.

The transmission 46 transmits a force applied to the operable member 45 to the bit sleeve 44. The transmission 46 serves as a converter that converts rotation of the operable member 45 into axial movement of the bit sleeve 44.

The operable member 45 includes a ring 45A, a cam 45B, recesses 45C, and protrusions 45D. The ring 45A is located radially outward from the boss 11H and the front cover 13. The cam 45B is located radially inward from the ring 45A. The recesses 45C are located on the inner surface of the ring 45A. As shown in FIG. 9, the multiple recesses 45C are located at intervals in the circumferential direction. The protrusions 45D are located on the outer surface of the ring 45A. The multiple protrusions 45D are located at intervals in the circumferential direction. The operator rotates the operable member 45 while gripping at least a part of the outer surface of the ring 45A and at least a part of the surfaces of the protrusions 45D. The multiple protrusions 45D reduce the likelihood that the operator's hand slides against the operable member 45.

The operable member 45 at least partly overlaps the anvil bearing 30 in the axial direction. In the present embodiment, the operable member 45 has the rear end at the same position as at least a part of the anvil bearing 30 in the axial direction.

The transmission 46 includes multiple (three in the present embodiment) pins 52 and a bit washer 53. The pins 52 are located rearward from the cam 45B. The pins 52 are movable in the axial direction while being in contact with the cam 45B in response to rotation of the operable member 45. The cam 45B has a cam surface 45E. The cam surface 45E faces rearward. The cam surface 45E is inclined toward the front in one circumferential direction. The pins 52 are movable in the axial direction while being in contact with the cam surface 45E in response to rotation of the operable member 45. The bit washer 53 is located rearward from the pins 52 and in contact with the pins 52 and the bit sleeve 44.

O-rings 56 are fitted on the pins 52. The pins 52 have grooves 52A on their outer circumferential surfaces to receive the O-rings 56. The pins 52 are received in guide holes 11K in the boss 11H. The pins 52 are movable in the axial direction while being guided along the guide holes 11K. The pins 52 are guided by the hammer case 11 to move in the axial direction. The pins 52 are supported by the hammer case 11 in a manner immovable relative to the hammer case 11 in the circumferential direction.

The bit washer 53 includes a ring 53A, protrusions 53B, and protrusions 53C. The protrusions 53B protrude radially outward from the ring 53A. The protrusions 53C protrude radially outward and frontward from the ring 53A. The pins 52 have the rear ends in contact with the protrusions 53B. The ring 53A is in contact with the operation portion 44C of the bit sleeve 44. The pins 52 move backward to push and move the bit washer 53 backward. The bit washer 53 then pushes and moves the bit sleeve 44 backward. The protrusions 53C are received in recesses 11L on the rear surface of the boss 11H. The bit washer 53 is thus supported by the hammer case 11 in a manner immovable relative to the hammer case 11 in the circumferential direction.

The positioner 47 positions the operable member 45 in the circumferential direction. The positioner 47 includes a leaf spring. As shown in FIG. 9, the positioner 47 is received in a recess 11M on the boss 11H. The positioner 47 is supported by the hammer case 11 in a manner immovable relative to the hammer case 11 in the circumferential direction.

The positioner 47 includes a body 47A and a protrusion 47B. The body 47A is received in the recess 11M on the boss 11H. The protrusion 47B is receivable in a selected one of the recesses 45C on the inner surface of the ring 45A. This positions the operable member 45 in the circumferential direction.

The operable member 45 is rotated to move the bit sleeve 44 in the axial direction between the movement-restricting position and the movement-permitting position. The operable member 45 is positioned at a first circumferential position by the positioner 47 to position the bit sleeve 44 at the movement-restricting position. The operable member 45 is positioned at a second circumferential position by the positioner 47 to position the bit sleeve 44 at the movement-permitting position. In other words, the positioner 47 fixes the rotational position of the operable member 45, and this fixes the axial position of the bit sleeve 44 connected to the operable member 45 through the transmission 46.

The sleeve spring 48 generates an elastic force for moving the bit sleeve 44 to the movement-permitting position. The sleeve spring 48 is a coil spring surrounding the anvil shaft 17A. The sleeve spring 48 is located rearward from the bit sleeve 44. The sleeve spring 48 has the front end in contact with the rear end of the contact portion 44A. The sleeve spring 48 has the rear end in contact with at least a part of the spindle shaft 15A. The sleeve spring 48 generates an elastic force for moving the bit sleeve 44 forward. In the present embodiment, the movement-permitting position is frontward from the movement-restricting position. The sleeve spring 48 generates an elastic force for moving the bit sleeve 44 forward to move the bit sleeve 44 to the movement-permitting position.

The elastic ring 49 generates an elastic force for moving the locking members 43 to the locking position. The elastic ring 49 surrounds the rear shaft portion 17Ar. The elastic ring 49 generates an elastic force for moving the locking members 43 forward and radially inward. The elastic ring 49 is, for example, an O-ring.

Operation of Tool Holder

To move the bit sleeve 44 from the movement-permitting position to the movement-restricting position, the operator operates the operable member 45 to rotate from the second circumferential position to the first circumferential position. With the operable member 45 being at the second circumferential position, the protrusion 47B of the positioner 47 is received in a predetermined one of the multiple recesses 45C on the operable member 45. When the operator rotates the operable member 45 from the second circumferential position to the first circumferential position, the positioner 47 elastically deforms and causes the protrusion 47B to come out of the recess 45C. This releases the operable member 45 positioned by the positioner 47, and allows the operator to rotate the operable member 45.

When the operable member 45 is rotated from the second circumferential position to the first circumferential position, the cam surface 45E of the operable member 45 pushes the pins 52 backward. The pins 52 then push the bit sleeve 44 backward through the bit washer 53. In other words, the bit sleeve 44 moves backward. The bit sleeve 44 moves backward against the elastic force from the sleeve spring 48. The bit sleeve 44 is thus placed at the movement-restricting position. With the bit sleeve 44 being at the movement-restricting position and the operable member 45 being at the first circumferential position, the protrusion 47B of the positioner 47 is received in a predetermined recess 45C on the operable member 45. Thus, the operable member 45 is positioned at the first circumferential position to position the bit sleeve 44 at the movement-restricting position.

To move the bit sleeve 44 from the movement-restricting position to the movement-permitting position, the operator operates the operable member 45 to rotate from the first circumferential position to the second circumferential position. Thus, the positioner 47 elastically deforms and causes the protrusion 47B to come out of the recess 45C. This releases the operable member 45 positioned by the positioner 47, and allows the operator to rotate the operable member 45.

When the operable member 45 positioned by the positioner 47 is released, the bit sleeve 44 moves forward under the elastic force from the sleeve spring 48. The operable member 45 rotated from the first circumferential position to the second circumferential position causes the bit sleeve 44 to move to the movement-permitting position under the elastic force from the sleeve spring 48. With the bit sleeve 44 being at the movement-permitting position and the operable member 45 being at the second circumferential position, the protrusion 47B of the positioner 47 is received in a predetermined recess 45C on the operable member 45. Thus, the operable member 45 is positioned at the second circumferential position to position the bit sleeve 44 at the movement-permitting position.

To attach the tip tool 61 to the anvil 17, the operator places the tip tool 61 in the insertion hole 42 through its front end opening. In the present embodiment, the operator can attach the tip tool 61 to the anvil 17 through either single-operation attachment or two-operation attachment.

The single-operation attachment refers to attaching the tip tool 61 to the anvil 17 by placing the tip tool 61 in the insertion hole 42 with the bit sleeve 44 being at the movement-restricting position. As shown in FIG. 17, with the bit sleeve 44 being at the movement-restricting position, the contact portion 44A is located radially outward from the locking members 43. In other words, the locking members 43 are at the locking position at which the contact portion 44A restricts radially outward movement of the locking members 43.

In response to the tip tool 61 being placed in the insertion hole 42 with the bit sleeve 44 being at the movement-restricting position, the tip tool 61 pushes the locking members 43 backward using a tapered surface 61B located at the rear end of the tip tool 61. This causes the locking members 43 to move to a position rearward from and away from the contact portion 44A. In other words, although the bit sleeve 44 is at the movement-restricting position, the locking members 43 pushed backward by the tip tool 61 come out of the locking position and move to the unlocking position. The elastic ring 49 is located rearward from the contact portion 44A. The locking members 43 pushed backward by the tip tool 61 move from the locking position to the unlocking position at which the locking members 43 are in contact with the elastic ring 49. The locking members 43, which are pushed by the tapered surface 61B, move to a position rearward and radially outward from the contact portion 44A while being in contact with the elastic ring 49. The movement of the locking members 43 causes the elastic ring 49 to elastically deform and expand its diameter. The locking members 43 moving radially outward allow the operator to place the tip tool 61 in the insertion hole 42.

In response to the tip tool 61 being placed in the insertion hole 42 to have the groove 61A on the tip tool 61 facing the locking members 43 at the unlocking position, the locking members 43 move forward and radially inward under the elastic force from the elastic ring 49. The locking members 43 move forward and radially inward to be received in the groove 61A on the tip tool 61 under the elastic force from the elastic ring 49. The locking members 43 received in the groove 61A are restricted from moving radially outward by the contact portion 44A. The locking members 43 are thus placed at the locking position under the elastic force from the elastic ring 49. This locks the tip tool 61.

The two-operation attachment refers to attaching the tip tool 61 to the anvil 17 by placing the tip tool 61 in the insertion hole 42 with the bit sleeve 44 being at the movement-permitting position to place at least parts of the locking members 43 in the groove 61A on the tip tool 61, and then placing the bit sleeve 44 at the movement-restricting position. In response to the tip tool 61 being placed in the insertion hole 42 with the bit sleeve 44 being at the movement-permitting position, the tip tool 61 pushes the locking members 43 radially outward using the tapered surface 61B located at the rear end of the tip tool 61. With the bit sleeve 44 being at the movement-permitting position, the locking members 43 pushed by the tip tool 61 come out of the locking position and move to the unlocking position.

In response to the tip tool 61 being placed in the insertion hole 42 to have the groove 61A on the tip tool 61 facing the locking members 43 at the unlocking position, the locking members 43 move radially inward to be received in the groove 61A through the through-holes 51. After the locking members 43 are placed in the groove 61A, the bit sleeve 44 is moved to the movement-restricting position. The contact portion 44A thus restricts the locking members 43 from moving radially outward from the groove 61A. The locking members 43 are thus placed at the locking position and lock the tip tool 61.

To remove the tip tool 61 from the anvil 17 through the insertion hole 42, the operator operates the operable member 45 to place the bit sleeve 44 at the movement-permitting position. In this state, the operator pulls the tip tool 61 from the insertion hole 42. The tip tool 61 thus pushes, with its outer surface, the locking members 43 radially outward. This causes the locking members 43 to come out of the groove 61A on the tip tool 61 and move to the unlocking position. With the locking members 43 being at the unlocking position, the operator can remove the tip tool 61 from the insertion hole 42.

Operation of Power Tool

The operation of the power tool 1 will now be described. For example, to perform a screw tightening operation on a workpiece, a tip tool 61 for the screw tightening operation is placed in the insertion hole 42 in the anvil 17. The tip tool 61 in the insertion hole 42 is held by the tool holder 18. After the tip tool 61 is attached to the anvil 17, the operator grips the grip 2B with, for example, a right hand and pulls the trigger lever 9A with a right index finger. Thus, power is fed from the battery pack 20 to the motor 6 to activate the motor 6. This causes the rotor shaft 22B of the rotor 22 to rotate. The rotational force from the rotor shaft 22B is then transmitted to the planetary gears 32 through the pinion gear 27. The planetary gears 32 meshing with the internal teeth on the internal gear 34 revolve about the pinion gear 27 while rotating. The planetary gears 32 are rotatably supported by the spindle 15 with the pins 33. The revolving planetary gears 32 cause the spindle 15 to rotate at a lower rotational speed than the rotor shaft 22B.

When the spindle 15 rotates with the inner hammer 35 and the anvil projections 17B in contact with each other, the anvil 17 rotates together with the inner hammer 35 and the spindle 15. The screwing operation proceeds in this manner.

When the anvil 17 receives a predetermined or higher load as the screwing operation proceeds, the anvil 17 and the inner hammer 35 stop rotating. This also stops the rotation of the outer hammer 36. When the inner hammer 35 and the outer hammer 36 stop rotating and the spindle 15 rotates, the inner hammer 35 moves backward while rotating. The inner hammer 35 thus comes out of contact with the anvil projections 17B. Although being rotatable together with the inner hammer 35, the outer hammer 36 is immovable relative to the hammer case 11 in the axial direction when the inner hammer 35 moves backward relative to the hammer case 11. The inner hammer 35 that has moved backward moves forward while rotating under the elastic force from the coil spring 39. The outer hammer 36 rotates together with the inner hammer 35. The anvil 17 is struck by the inner hammer 35 and the outer hammer 36 in the rotation direction. The anvil 17 thus rotates with high torque about the rotation axis AX. The screw is thus fastened to the workpiece under high torque.

The power tool 1 according to the present embodiment includes the motor 6, the spindle 15, the inner hammer 35, the anvil 17, the locking members 43, and the bit sleeve 44. The spindle 15 is located frontward from the motor 6 and rotatable by the motor 6. The inner hammer 35 is supported by the spindle 15. The anvil 17 is strikable by the inner hammer 35 in the rotation direction and has the insertion hole 42 extending rearward from the front end of the anvil 17. The locking members 43 are supported by the anvil 17 and movable to the locking position for locking the tip tool 61 placed in the insertion hole 42 and to the unlocking position for unlocking the tip tool 61. The bit sleeve 44 surrounds the anvil 17 and is movable to the movement-restricting position for restricting radially outward movement of the locking members 43 and to the movement-permitting position for permitting radially outward movement of the locking members 43. The bit sleeve 44 is at least partly between the inner hammer 35 and the anvil 17 in the radial direction.

The bit sleeve 44 is at least partly between the inner hammer 35 and the anvil 17 in the radial direction, and thus the power tool 1 has less size increase. In particular, the power tool 1 has a reduced axial length. In the present embodiment, the axial length of the power tool 1 refers to the axial distance between the rear end of the rear cover 3 and the front end of the body assembly 4A. In the present embodiment, the front end of the body assembly 4A includes the front end of the front cover 13.

In the present embodiment, at least one of the inner hammer 35 or the outer hammer 36 overlaps the locking members 43 in the axial direction.

The power tool 1 with this structure has a reduced axial length.

The power tool 1 according to the present embodiment includes the anvil bearing 30 supporting the anvil 17 in a rotatable manner. The bit sleeve 44 is located rearward from the anvil bearing 30.

The power tool 1 with this structure has a reduced axial length.

The locking members 43 in the present embodiment are located rearward from the anvil bearing 30.

The power tool 1 with this structure has a reduced axial length.

The power tool 1 according to the present embodiment includes the hammer case 11 holding the anvil bearing 30. The bit sleeve 44 is accommodated in the hammer case 11.

The power tool 1 with this structure has a reduced axial length.

The hammer case 11 in the present embodiment accommodates at least a part of the anvil 17.

The power tool 1 with this structure has a reduced axial length.

The bit sleeve 44 in the present embodiment is accommodated in the hammer case 11.

The power tool 1 with this structure has a reduced axial length.

The locking members 43 in the present embodiment are accommodated in the hammer case 11.

The power tool 1 with this structure has a reduced axial length.

The power tool 1 according to the present embodiment includes the operable member 45 operable to move the bit sleeve 44, and the transmission 46 for transmitting a force applied to the operable member 45 to the bit sleeve 44. The operable member 45 is located outside the hammer case 11.

The operator can thus operate the operable member 45 easily.

The anvil 17 in the present embodiment includes the support recesses 50 on its outer surface. The locking members 43 are balls supported in the support recesses 50. The anvil 17 has the through-holes 51 connecting the inner surfaces of the support recesses 50 to the inner surface of the insertion hole 42. The locking members 43 are at least partly receivable in the groove 61A on the side surface of the tip tool 61 through the through-holes 51 to lock the tip tool 61. The locking position includes a position at which the locking members 43 are at least partly received in the groove 61A.

This structure allows the tip tool to be locked with the locking members 43 that are balls.

Second Embodiment

A second embodiment will now be described. The same or corresponding components as those in the above embodiment are given the same reference numerals herein and will be described briefly or will not be described.

Figure 18:
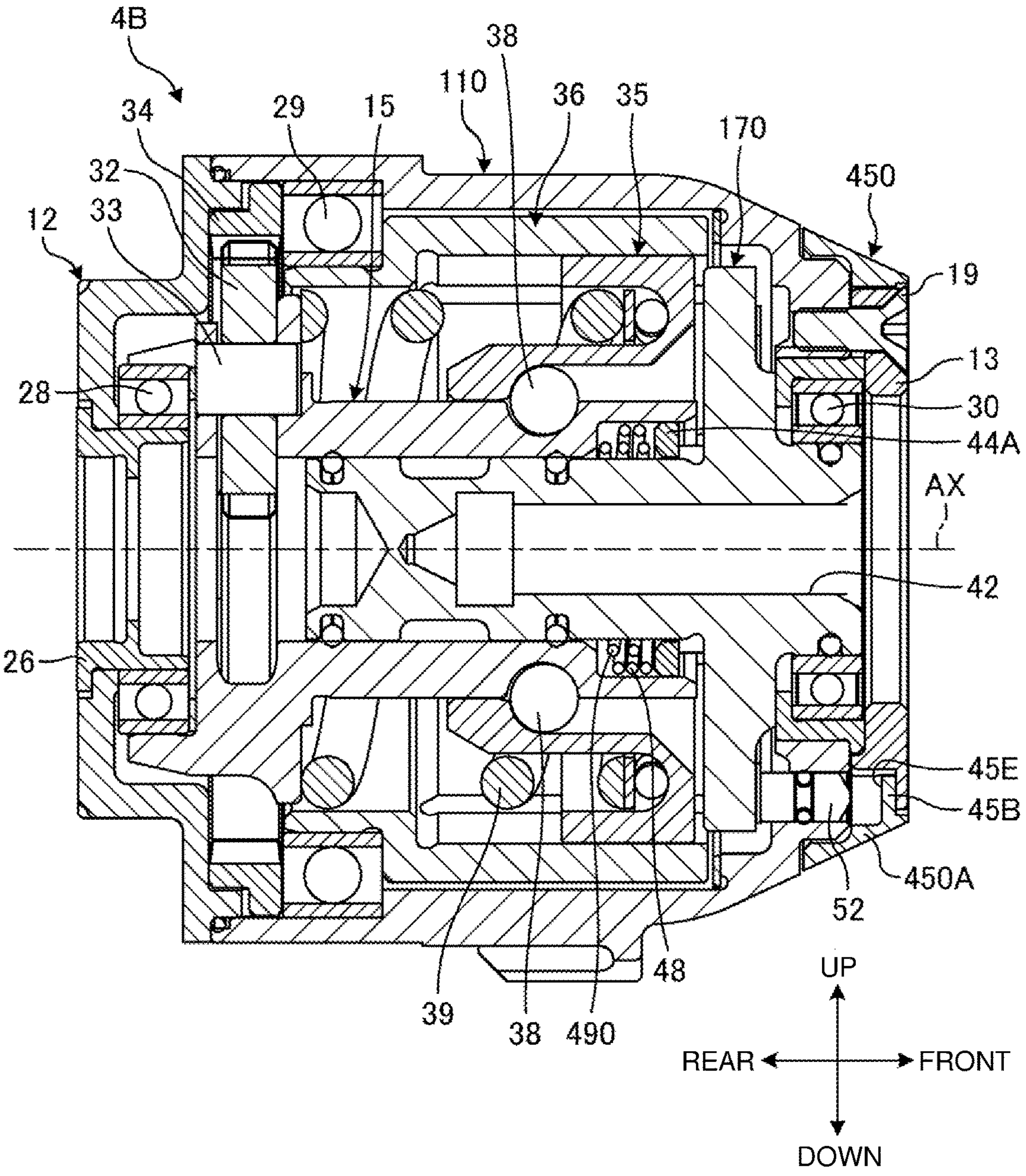
FIG. 18 is a longitudinal sectional view of a body assembly in a second embodiment.
Figure 19:
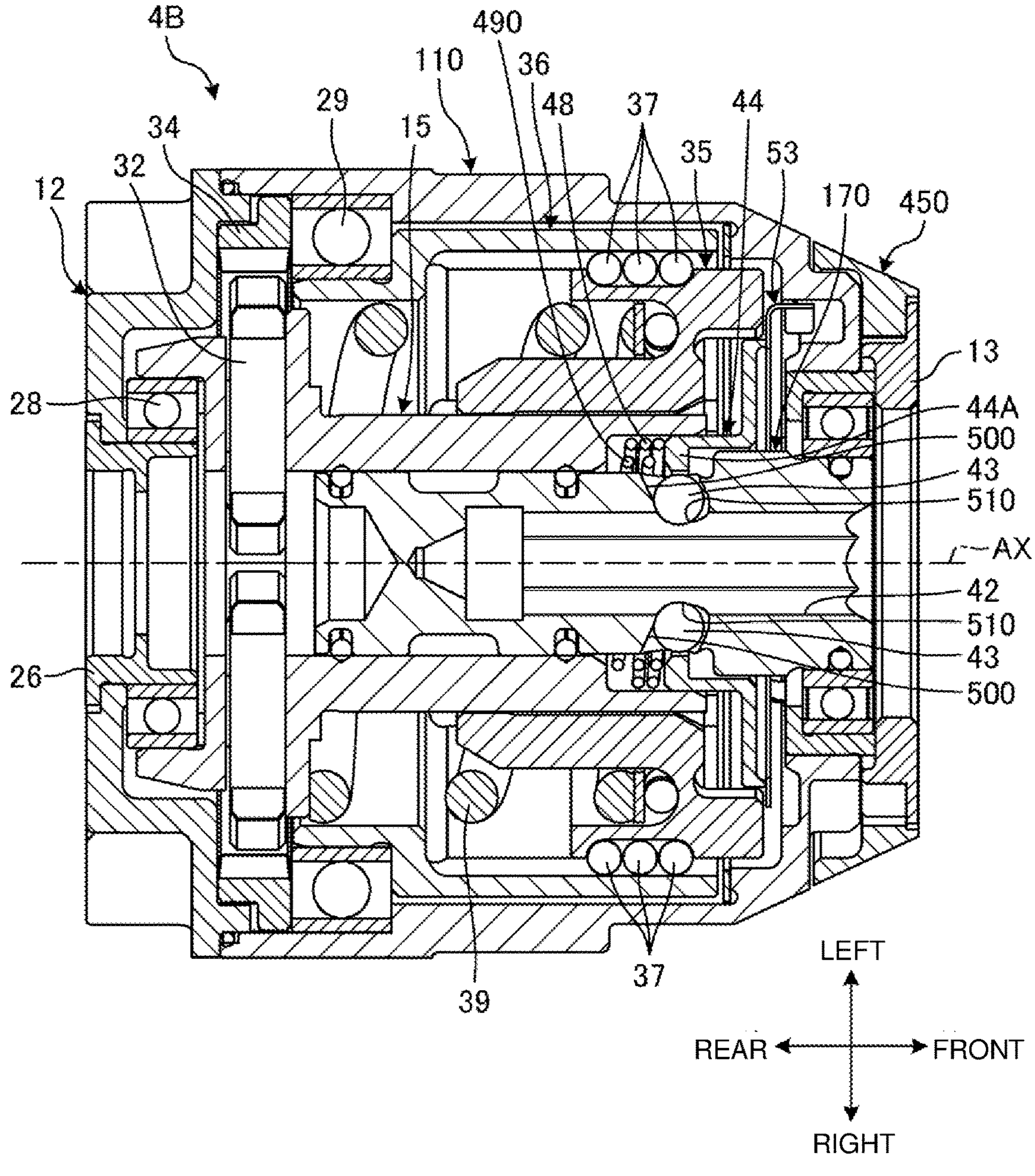
FIG. 19 is a horizontal sectional view of the body assembly in the second embodiment.
Figure 20:
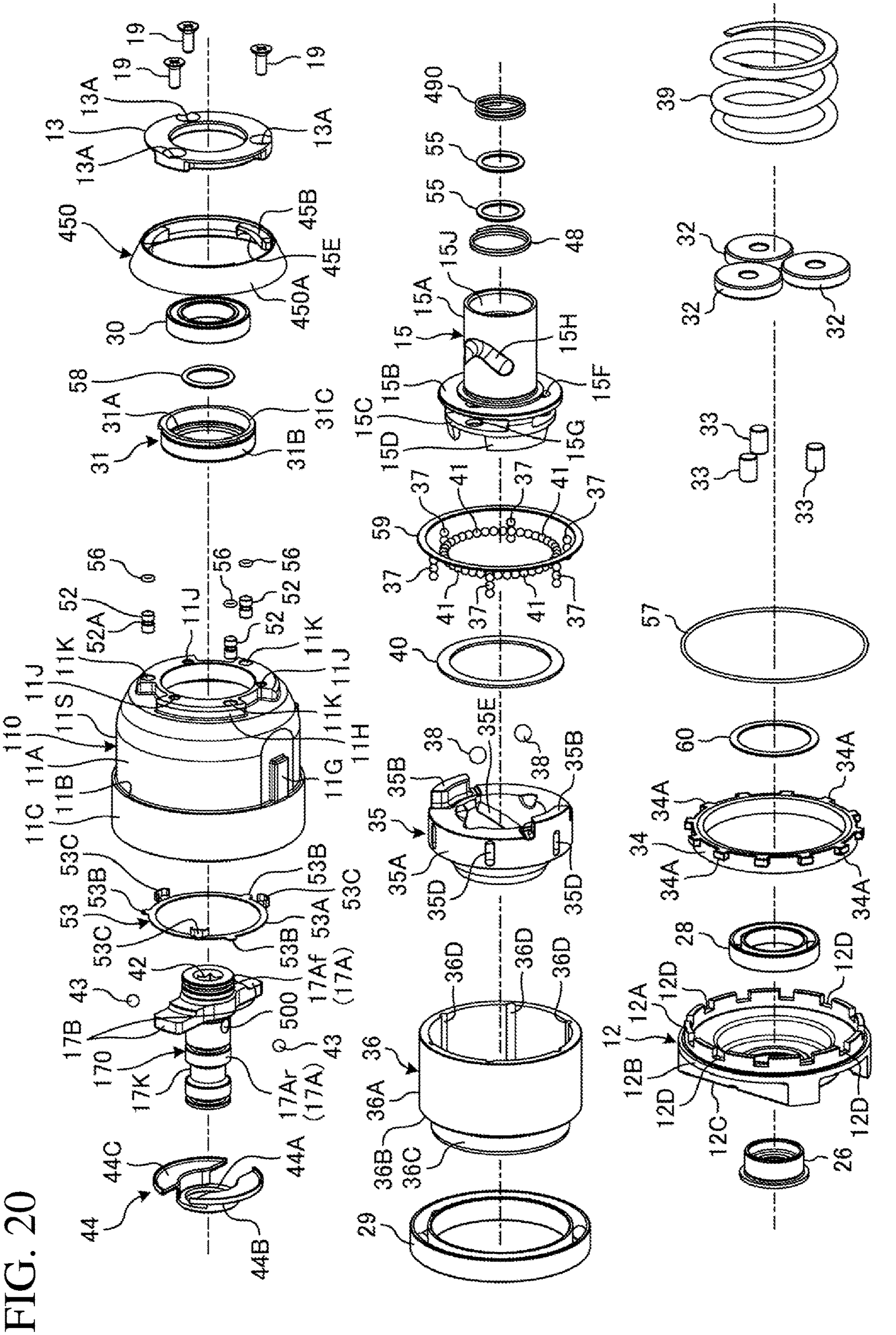
FIG. 20 is an exploded perspective view of the body assembly in the second embodiment.

FIG. 18 is a longitudinal sectional view of a body assembly 4B in the present embodiment. FIG. 19 is a horizontal sectional view of the body assembly 4B in the present embodiment. FIG. 20 is an exploded perspective view of the body assembly 4B in the present embodiment.

In the first embodiment, the anvil 17 receives the tip tool 61 through either the single-operation attachment or the two-operation attachment. In the present embodiment, an anvil 170 receives the tip tool 61 through the two-operation attachment and not through the single-operation attachment.

The body assembly 4B includes a hammer case 110, the anvil 170, and an operable member 450. The anvil 170 is accommodated in the hammer case 110. The operable member 450 is rotatable at the front end of the hammer case 110.

The anvil 170 has support holes 500 and openings 510. The support holes 500 receive the locking members 43. The openings 510 connect the support holes 500 and the insertion hole 42. The support holes 500 connect the outer surface of the anvil 170 to the inner surface of the insertion hole 42. The support holes 500 are inclined radially inward toward the front. The support holes 500 are each substantially circular in section. The locking members 43 are movable through the support holes 500 while being guided along the inner surfaces of the support holes 500. A coil spring 490 covers radially outer openings of the support holes 500.

To attach the tip tool 61 to the anvil 170, the operable member 450 is operated to place the bit sleeve 44 at the movement-permitting position. The operable member 450 is operable by the operator to rotate in the circumferential direction. With the bit sleeve 44 being at the movement-permitting position, the tip tool 61 is placed in the insertion hole 42. The tip tool 61 pushes the locking members 43 radially outward using the tapered surface 61B located at the rear end of the tip tool 61. This causes the locking members 43 to move from the locking position to the unlocking position. In the present embodiment, the coil spring 490 surrounds the anvil 170, instead of the elastic ring 49 described in the first embodiment. In response to the tip tool 61 being placed in the insertion hole 42 to have the groove 61A on the tip tool 61 facing the locking members 43 at the unlocking position, the locking members 43 move radially inward under the elastic force from the coil spring 490. The locking members 43 move radially inward to be received in the groove 61A through the support holes 500.

After the locking members 43 are received in the groove 61A, the operable member 450 is operated to place the bit sleeve 44 at the movement-restricting position. The operable member 450 is operable by the operator to rotate in the circumferential direction. When the bit sleeve 44 is moved to the movement-restricting position, the contact portion 44A restricts the locking members 43 from moving radially outward from the groove 61A. The locking members 43 are thus placed at the locking position and restricted from moving radially outward. This locks the tip tool 61.

For the hammer case 11 accommodating both the contact portion 44A of the bit sleeve 44 and the locking members 43, the locking members 43 at the locking position may be far from the front end opening of the insertion hole 42. This may limit the type of tip tool 61 that can be locked with the locking members 43. For example, the locking members 43 may fail to lock the tip tool 61 having a short distance between the groove 61A and the rear end of the tip tool 61. The support holes 500 in the present embodiment are inclined radially inward toward the front. This reduces the axial distance between the front end opening of the insertion hole 42 and each locking member 43 at the locking position. The locking members 43 can thus lock the tip tool 61 having a short distance between the groove 61A and the rear end of the tip tool 61.

Third Embodiment

A third embodiment will now be described. The same or corresponding components as those in the above embodiments are given the same reference numerals herein and will be described briefly or will not be described.

Figure 21:
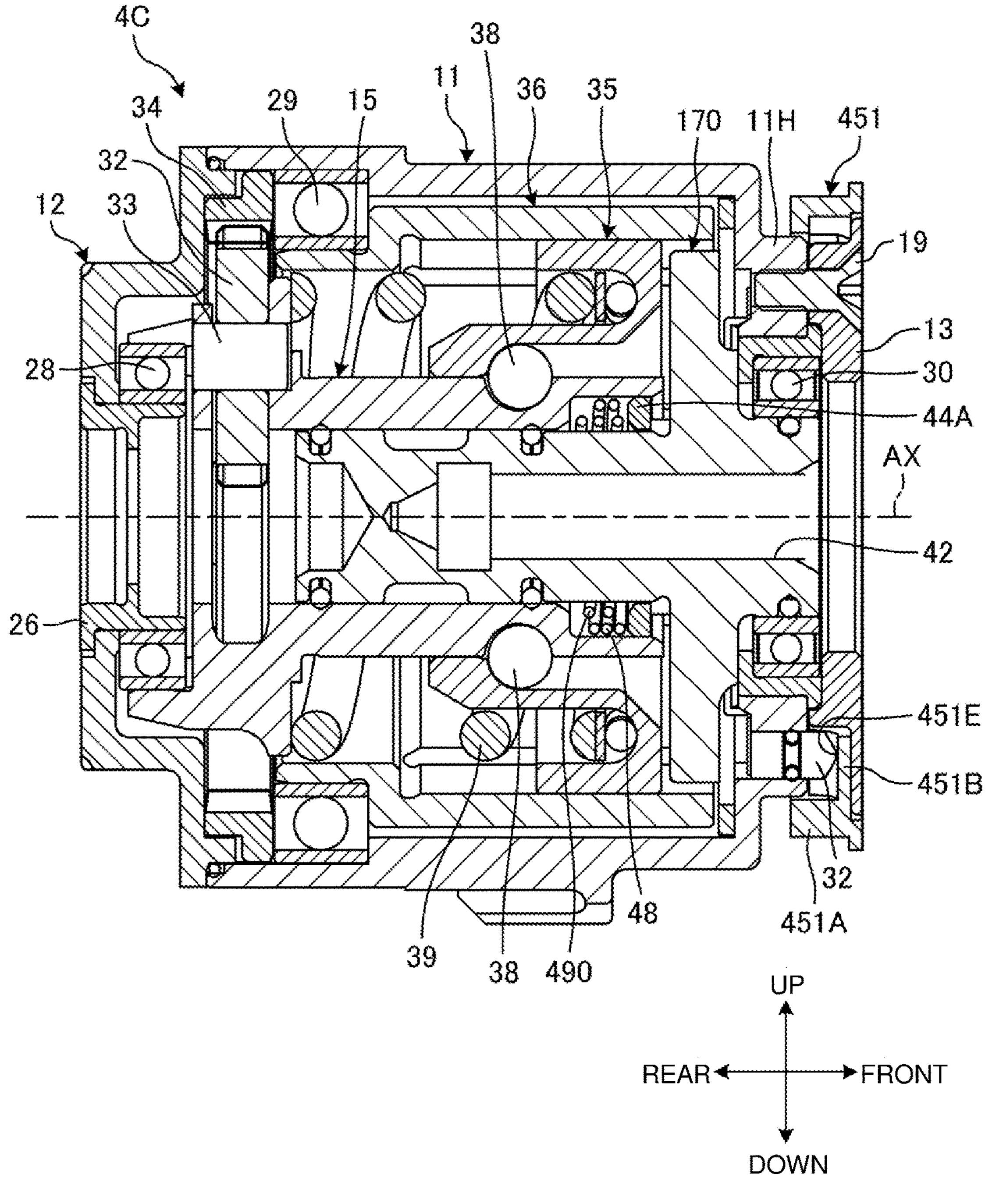
FIG. 21 is a longitudinal sectional view of a body assembly in a third embodiment.
Figure 22:
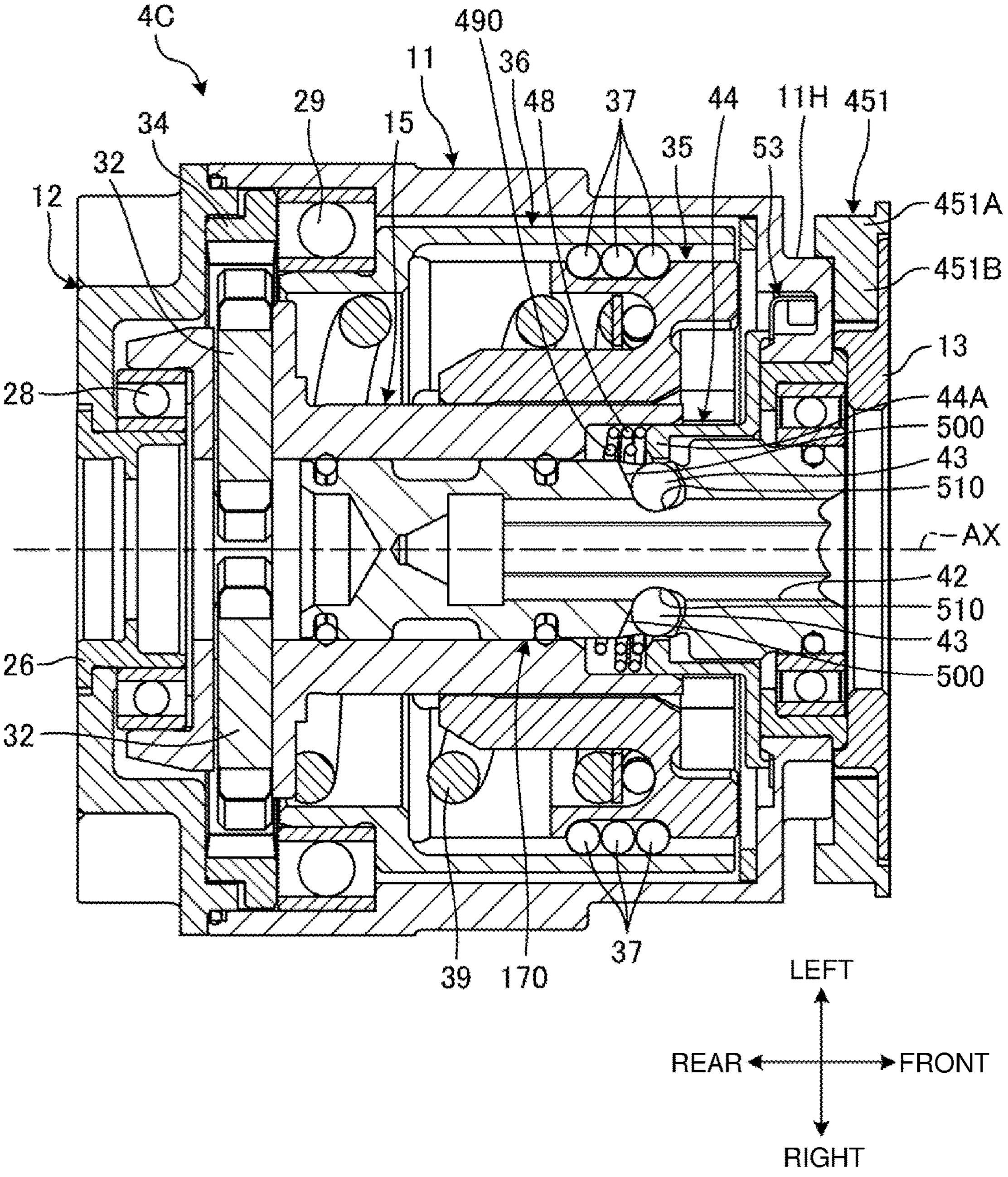
FIG. 22 is a horizontal sectional view of the body assembly in the third embodiment.
Figure 23:
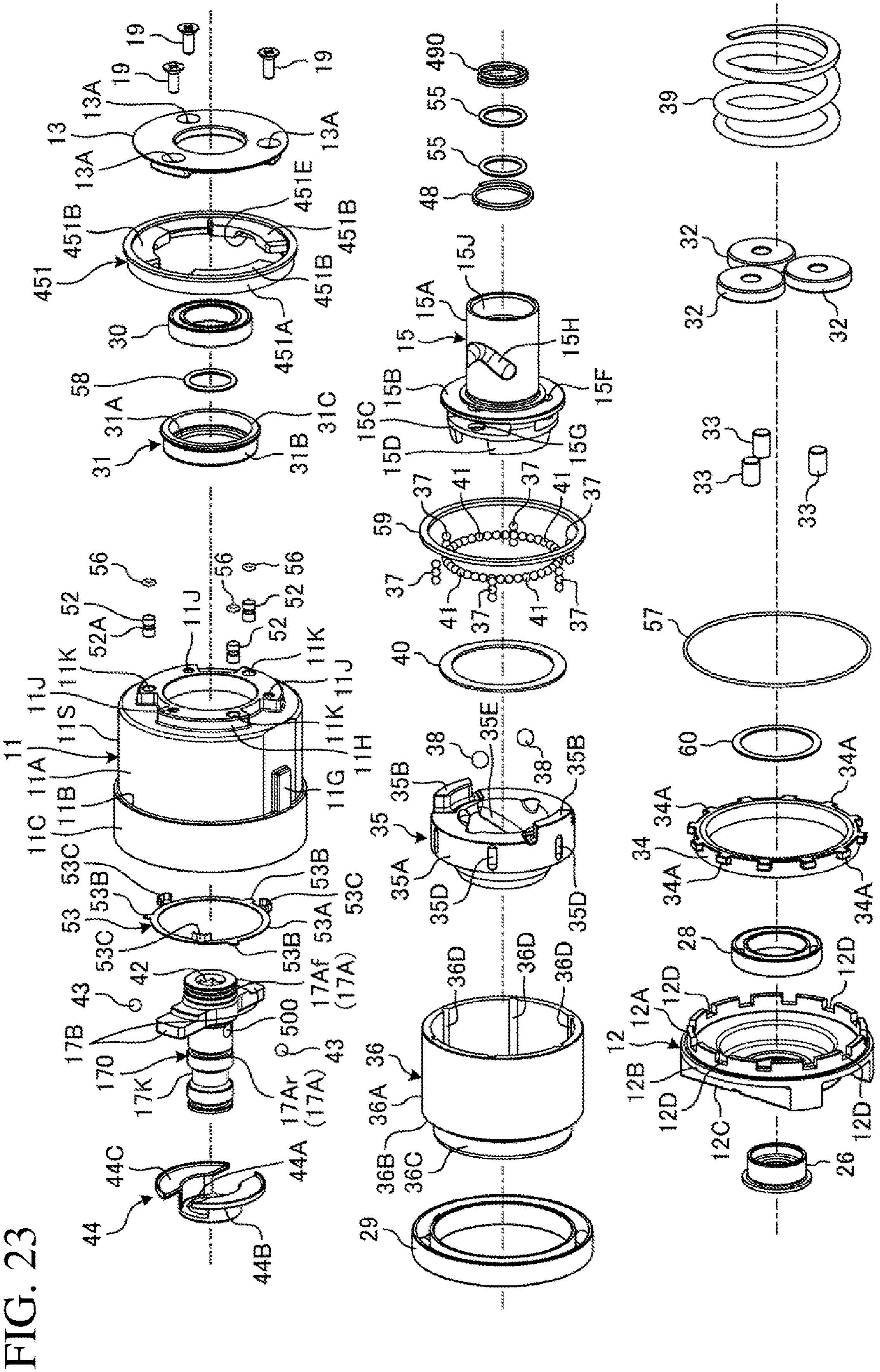
FIG. 23 is an exploded perspective view of the body assembly in the third embodiment.

FIG. 21 is a longitudinal sectional view of a body assembly 4C in the present embodiment. FIG. 22 is a horizontal sectional view of the body assembly 4C in the present embodiment. FIG. 23 is an exploded perspective view of the body assembly 4C in the present embodiment.

In the first embodiment, the operable member 45 is rotated in the circumferential direction to move the bit sleeve 44 in the axial direction. In the present embodiment, an operable member 451 is moved in the axial direction to move the bit sleeve 44 in the axial direction.

The body assembly 4C in the present embodiment includes the anvil 170 and the coil spring 490 described in the second embodiment. The body assembly 4C in the present embodiment includes no positioner (47).

The operable member 451 is supported by the front end of the hammer case 11 in a manner movable in the axial direction. The operable member 451 includes a ring 451A and push portions 451B. The ring 451A is located radially outward from the boss 11H and the front cover 13. The push portions 451B are located radially inward from the ring 451A. The push portions 451B have push surfaces 451E. The push surfaces 451E face rearward. The push surfaces 451E include inner surfaces of recesses on the rear surfaces of the push portions 451B. The pins 52 have the front ends in contact with the push surfaces 451E. The pins 52 are movable in the axial direction while being in contact with the push surfaces 451E in response to movement of the operable member 451. The bit washer 53 is in contact with the pins 52 and the bit sleeve 44.

To move the bit sleeve 44 from the movement-permitting position to the movement-restricting position, the operator operates the operable member 451 to move backward. This causes the push surfaces 451E of the operable member 451 to push the pins 52 backward. The pins 52 then push the bit sleeve 44 backward through the bit washer 53, causing the bit sleeve 44 to move backward. The bit sleeve 44 moves backward against the elastic force from the sleeve spring 48. The bit sleeve 44 is thus placed at the movement-restricting position.

To move the bit sleeve 44 from the movement-restricting position to the movement-permitting position, the operator operates the operable member 451 to move forward. This causes the bit sleeve 44 to move forward against the elastic force from the sleeve spring 48. The bit sleeve 44 is thus placed at the movement-permitting position.

Fourth Embodiment

A fourth embodiment will now be described. The same or corresponding components as those in the above embodiments are given the same reference numerals herein and will be described briefly or will not be described.

Figure 24:
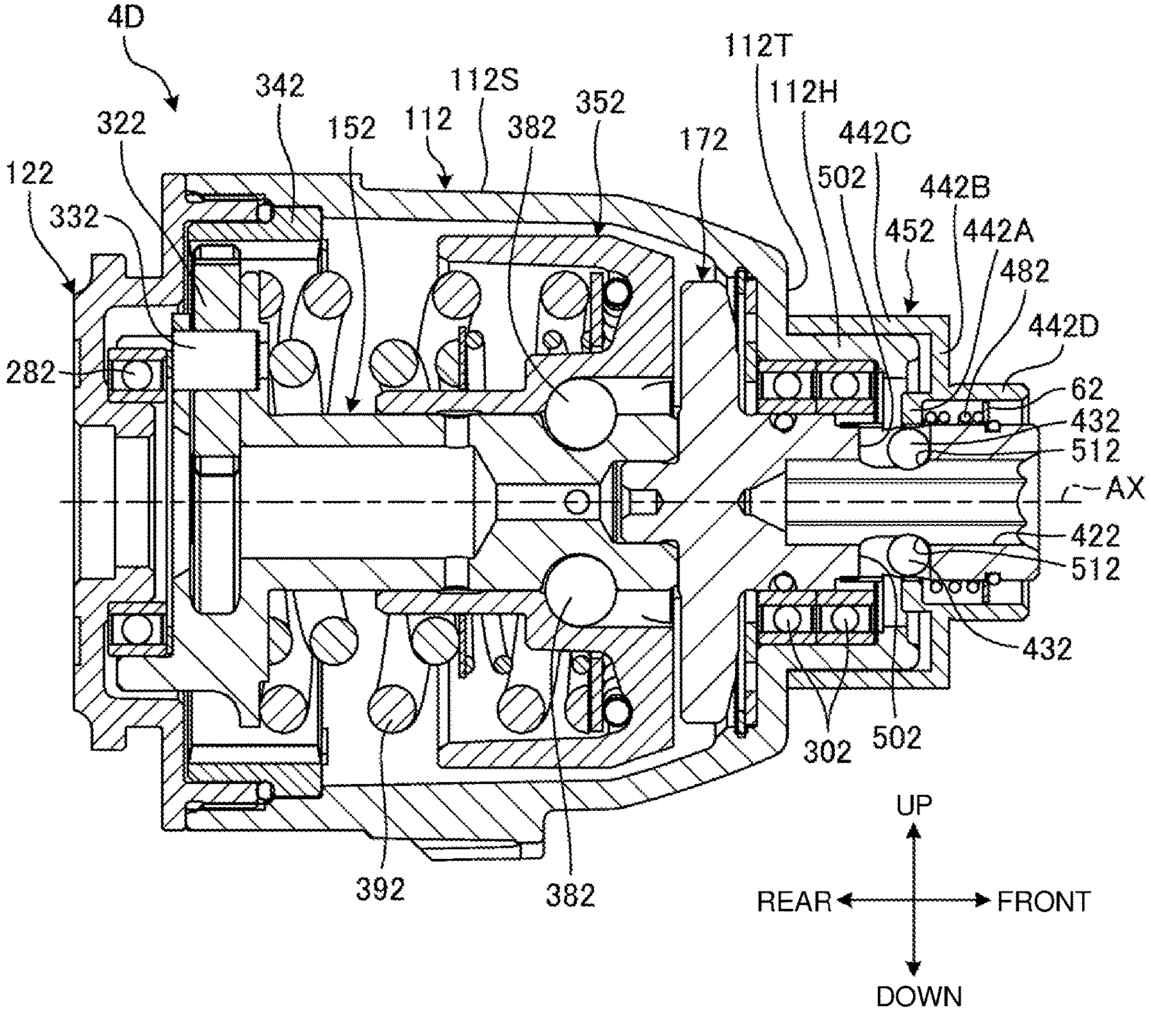
FIG. 24 is a longitudinal sectional view of a body assembly in a fourth embodiment.
Figure 25:
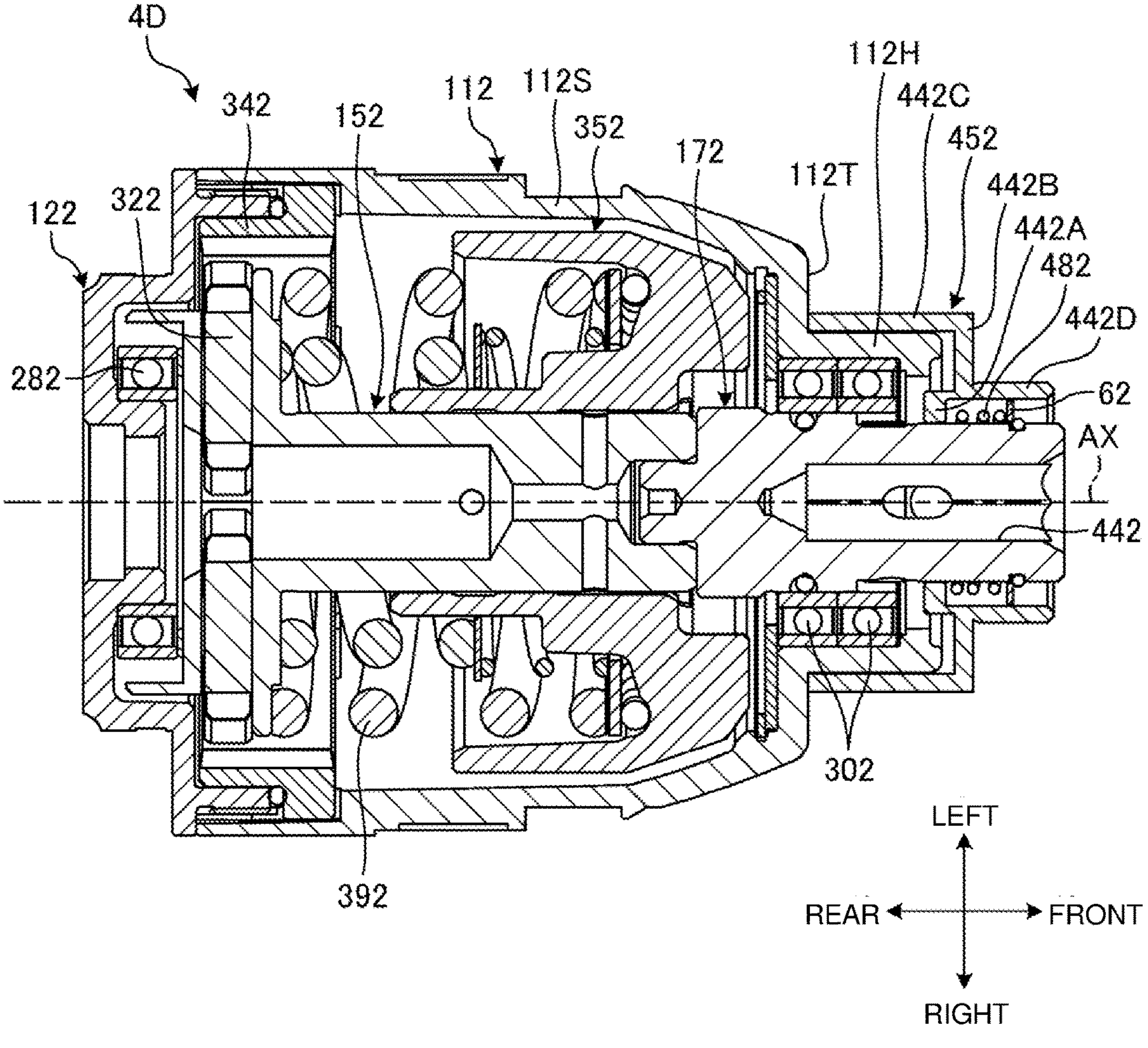
FIG. 25 is a horizontal sectional view of the body assembly in the fourth embodiment.

FIG. 24 is a longitudinal sectional view of a body assembly 4D in the present embodiment. FIG. 25 is a horizontal sectional view of the body assembly 4D in the present embodiment.

In the first embodiment, the operable member 45 is located outside the hammer case 11, and the bit sleeve 44 is accommodated in the hammer case 11. In the present embodiment, an operable member 452 is located outside a hammer case 112, and includes at least a part that serves as a bit sleeve.

As shown in FIGS. 24 and 25, the body assembly 4D includes the hammer case 112, a gear case 122, a spindle bearing 282, planetary gears 322, pins 332, an internal gear 342, a spindle 152, a hammer 352, balls 382, a coil spring 392, an anvil 172, an anvil bearing 302, locking members 432, the operable member 452, and a sleeve spring 482.

The hammer case 112 includes a cylinder 112S, a front plate 112T, and a boss 112H. The gear case 122 is fixed to the rear end of the hammer case 112. The gear case 122 holds the spindle bearing 282. The gear case 122 holds the internal gear 342.

The anvil 172 has an insertion hole 422, support recesses 502, and through-holes 512. The insertion hole 422 receives the tip tool 61. The support recesses 502 receive the locking members 432. The through-holes 512 connect the inner surfaces of the support recesses 502 to the inner surface of the insertion hole 422.

The operable member 452 is movably supported by the hammer case 112. The operable member 452 is located outside the hammer case 112. The operable member 452 is supported by the boss 112H in a manner movable in the front-rear direction. The operable member 452 serves as a bit sleeve. The operable member 452 includes a contact portion 442A, a front plate 442B, an operation portion 442C, and a cylinder 442D. The contact portion 442A can come in contact with the locking members 432. The front plate 442B is located radially outward from each of the contact portion 442A and the cylinder 442D. The front plate 442B is connected to each of the contact portion 442A and the cylinder 442D. The front plate 442B extends radially outward from the rear end of the cylinder 442D. The operation portion 442C surrounds the boss 112H. The operation portion 442C is cylindrical. The operation portion 442C has the front end connected to the outer edge of the front plate 442B. The cylinder 442D surrounds a front portion of the anvil 172.

The sleeve spring 482 generates an elastic force for moving the operable member 452 to the movement-restricting position. The sleeve spring 482 surrounds the front portion of the anvil 172. The sleeve spring 482 is between the front portion of the anvil 172 and the cylinder 442D in the radial direction. The sleeve spring 482 has the rear end in contact with the front end of the contact portion 442A. The sleeve spring 482 has the front end supported by a washer 62. The washer 62 is supported by the anvil 172.

The locking members 432 are movable to the locking position and the unlocking position. At the locking position, the locking members 432 lock the tip tool 61 received in the insertion hole 422. At the unlocking position, the locking members 432 unlock the tip tool 61. The contact portion 442A of the operable member 452 is movable to the movement-restricting position and the movement-permitting position. At the movement-restricting position, the contact portion 442A restricts radially outward movement of the locking members 432. At the movement-permitting position, the contact portion 442A permits radially outward movement of the locking members 432.

The anvil bearing 302 and the operable member 452 at least partly overlap each other in the axial direction. In the present embodiment, the anvil bearing 302 and the operation portion 442C are at least partly overlap each other in the axial direction.

To move the contact portion 442A of the operable member 452 from the movement-restricting position to the movement-permitting position, the operator operates the operable member 452 to move forward. The operator holds the operation portion 442C or the cylinder 442D with fingers to move the operable member 452 forward. The operable member 452 is moved forward against the elastic force from the sleeve spring 482. The contact portion 442A is thus placed at the movement-permitting position.

To move the contact portion 442A of the operable member 452 from the movement-permitting position to the movement-restricting position, the operator operates the operable member 452 to move backward. The operable member 452 moves backward under the elastic force from the sleeve spring 482. The contact portion 442A is thus placed at the movement-restricting position.

Fifth Embodiment

A fifth embodiment will now be described. The same or corresponding components as those in the above embodiments are given the same reference numerals herein and will be described briefly or will not be described.

Figure 26:
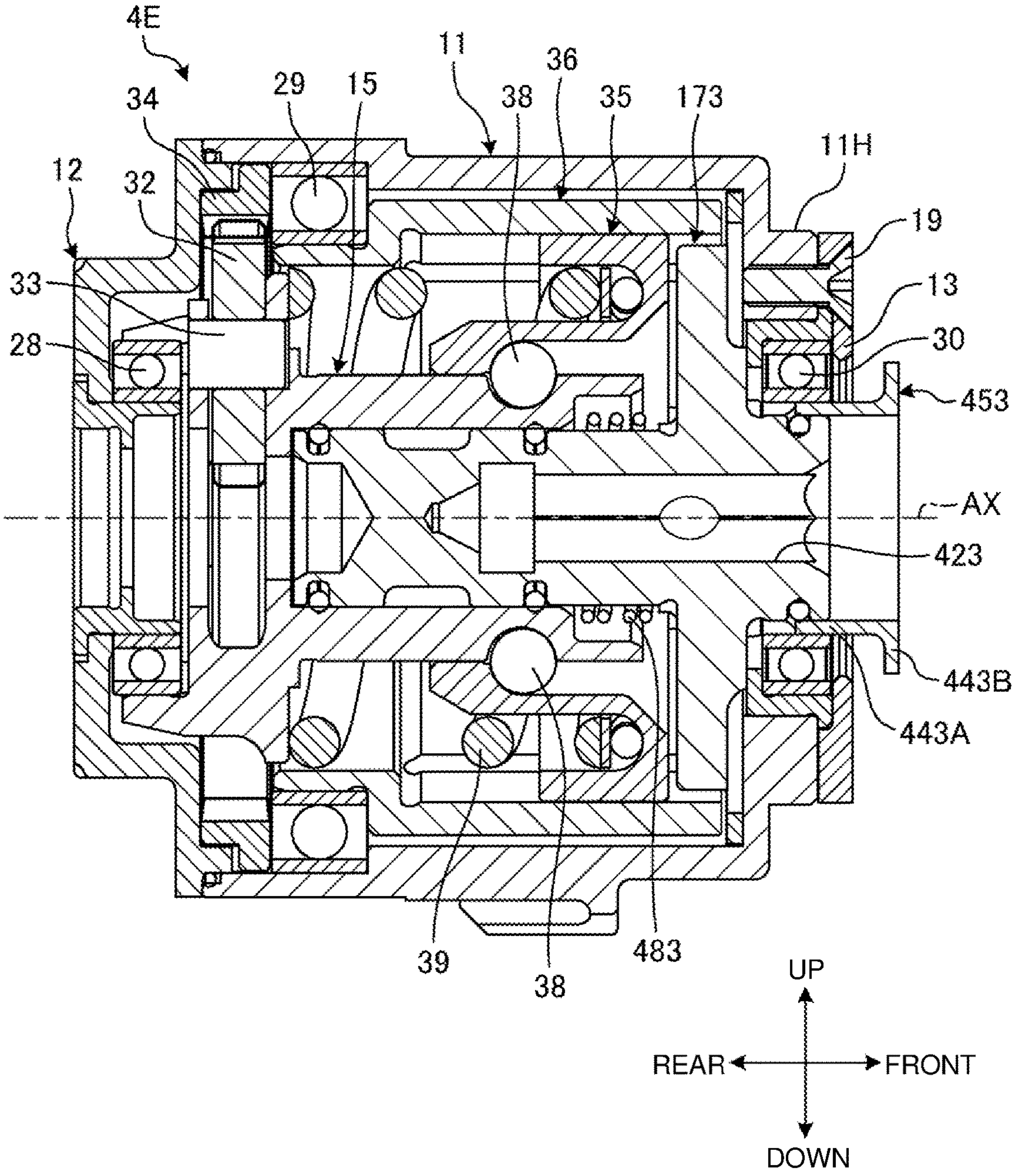
FIG. 26 is a longitudinal sectional view of a body assembly in a fifth embodiment.
Figure 27:
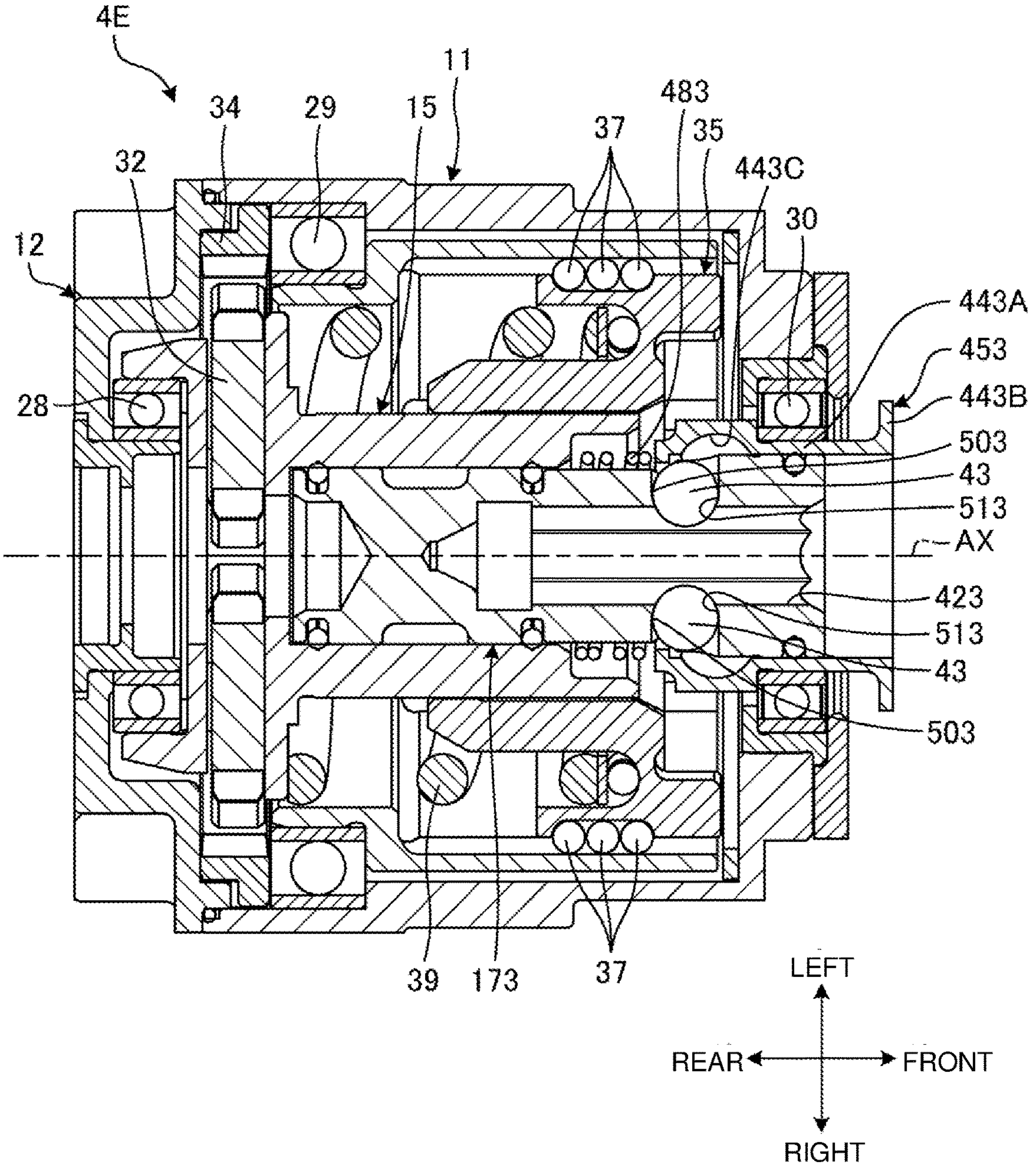
FIG. 27 is a horizontal sectional view of the body assembly in the fifth embodiment.

FIG. 26 is a longitudinal sectional view of a body assembly 4E in the present embodiment. FIG. 27 is a horizontal sectional view of the body assembly 4E in the present embodiment.

In the first embodiment, the operable member 45 is located outside the hammer case 11, and the bit sleeve 44 is accommodated in the hammer case 11. In the present embodiment, an operable member 453 includes a part located outside the hammer case 11 and includes a part located inside the hammer case 11, and the part of the operable member 453 located inside the hammer case 11 serves as a bit serve.

The body assembly 4E includes an anvil 173 and the operable member 453. The anvil 173 is accommodated in the hammer case 11. The operable member 453 is movably supported by the anvil 173.

The anvil 173 has an insertion hole 423, support recesses 503, and through-holes 513. The support recesses 503 receive the locking members 43. The through-holes 513 connect the inner surfaces of the support recesses 503 to the inner surface of the insertion hole 423.

The operable member 453 includes a cylinder 443A, an operation portion 443B, and a recess 443C. The cylinder 443A surrounds the anvil 173. The cylinder 443A is at least partly accommodated in the hammer case 11. The cylinder 443A has the rear end that can come in contact with the locking members 43. The operation portion 443B is located outside the hammer case 11. The recess 443C is located inside the hammer case 11. The recess 443C is located on the inner surface of the cylinder 443A. The recess 443C is recessed radially outward from the inner surface of the cylinder 443A.

A sleeve spring 483 is located rearward from the cylinder 443A. The sleeve spring 483 surrounds the anvil 173. The sleeve spring 483 generates an elastic force for moving the operable member 453 forward. The sleeve spring 483 generates an elastic force for moving the operable member 453 to the movement-restricting position.

The operable member 453 is at least partly between the inner hammer 35 and the anvil 173 in the radial direction. The operable member 453 is at least partly between the anvil bearing 30 and the anvil 173 in the radial direction. The operable member 453 is at least partly located rearward from the anvil bearing 30. The locking members 43 are located rearward from the anvil bearing 30. The locking members 43 overlap the inner hammer 35 in the axial direction.

The locking members 43 are movable to the locking position and the unlocking position. At the locking position, the locking members 43 lock the tip tool 61 received in the insertion hole 423. At the unlocking position, the locking members 43 unlock the tip tool 61. The operable member 453 is supported by the anvil 173 in a manner movable in the axial direction. The operable member 453 is movable to the movement-restricting position and the movement-permitting position. At the movement-restricting position, the operable member 453 restricts radially outward movement of the locking members 43. At the movement-permitting position, the operable member 453 permits radially outward movement of the locking members 43.

To move the operable member 453 from the movement-restricting position to the movement-permitting position, the operator operates the operable member 453 to move backward. For example, the operator holds the operation portion 443B with fingers to move the operable member 453 backward. The operable member 453 is moved backward against the elastic force from the sleeve spring 483. The operable member 453 is thus placed at the movement-permitting position. The locking members 43 can thus move radially outward. The locking members 43 moving radially outward are received in the recess 443C.

To move the operable member 453 from the movement-permitting position to the movement-restricting position, the operator operates the operation portion 443B to move the operable member 453 forward. The operable member 453 moves forward under the elastic force from the sleeve spring 483. The operable member 453 is thus placed at the movement-restricting position.

Sixth Embodiment

A sixth embodiment will now be described. The same or corresponding components as those in the above embodiments are given the same reference numerals herein and will be described briefly or will not be described.

Figure 28:
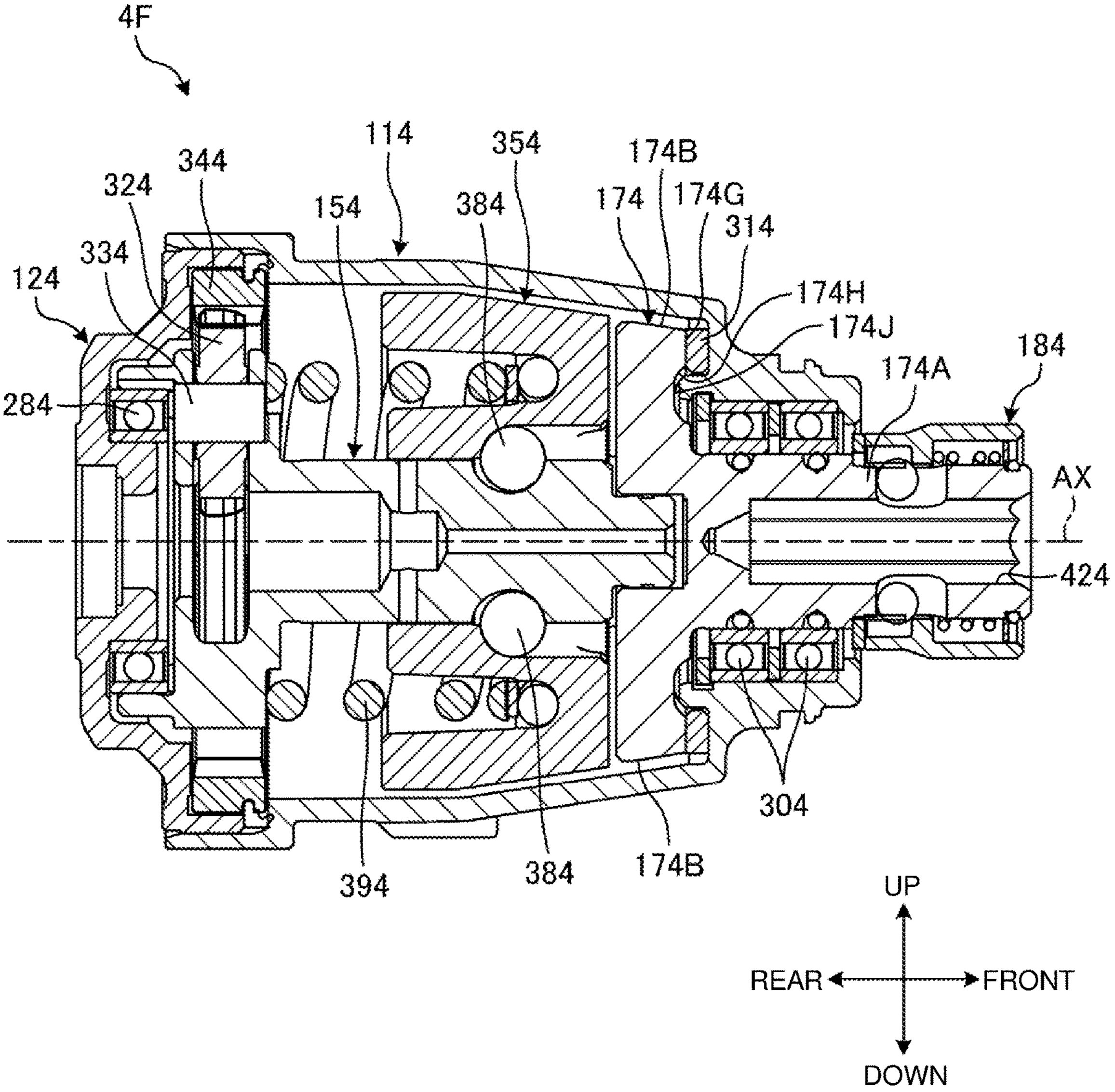
FIG. 28 is a longitudinal sectional view of a body assembly in a sixth embodiment.
Figure 29:
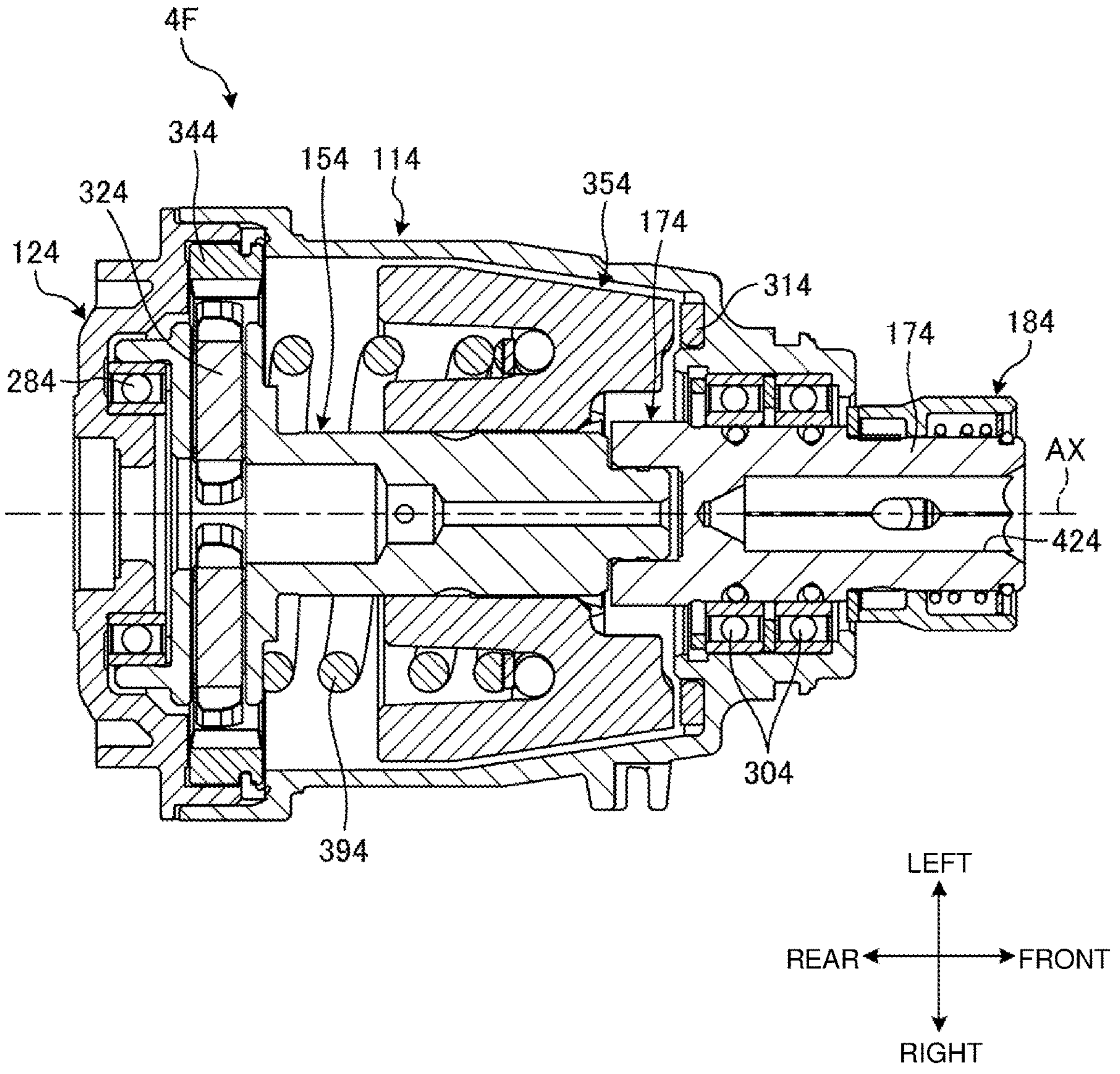
FIG. 29 is a horizontal sectional view of the body assembly in the sixth embodiment.

FIG. 28 is a longitudinal sectional view of a body assembly 4F in the present embodiment. FIG. 29 is a horizontal sectional view of the body assembly 4F in the present embodiment.

In the first embodiment, each anvil projection 17B has the front surface including the first surface 17G in contact with at least a part of the bearing holder 31 and the second surface 17J apart from the bearing holder 31. In the present embodiment, a ring member 314 is located frontward from anvil projections 174B in an anvil 174. Each anvil projection 174B has the front surface including a first surface 174G in contact with the ring member 314 and a second surface 174J apart from the ring member 314.

As shown in FIGS. 28 and 29, the body assembly 4F includes a hammer case 114, a gear case 124, a spindle bearing 284, planetary gears 324, pins 334, an internal gear 344, a spindle 154, a hammer 354, balls 384, a coil spring 394, the anvil 174, an anvil bearing 304, and a tool holder 184.

The anvil 174 includes an anvil shaft 174A and the anvil projections 174B. The anvil shaft 174A has an insertion hole 424 to receive the tip tool 61.

Each anvil projection 174B has the front surface including the first surface 174G and the second surface 174J. The second surface 174J is connected to the first surface 174G with a step surface 174H in between. The second surface 174J is located rearward from the first surface 174G. The first surface 174G is located radially outward from the second surface 174J. In the present embodiment, each anvil projection 174B has a recess on its front surface. The first surface 174G is located radially outward from the recess. The step surface 174H includes a portion of the inner surface of the recess. The second surface 174J includes a portion of the inner surface of the recess.

The ring member 314 is in contact with the first surface 174G. The first surface 174G is in contact with at least apart of the ring member 314. The second surface 174J is apart from the ring member 314. The anvil 174 rotates with the first surface 174G being in contact with the rear surface of the ring member 314.

The ring member 314 is formed from a synthetic resin such as a nylon resin. The ring member 314 is supported by the hammer case 114. The ring member 314 may be fixed to the hammer case 114, or may be movably supported by the hammer case 114. The ring member 314 in the present embodiment is supported by the hammer case 114 in a manner rotatable about the rotation axis AX.

Seventh Embodiment

A seventh embodiment will now be described. The same or corresponding components as those in the above embodiments are given the same reference numerals herein and will be described briefly or will not be described.

Figure 30:
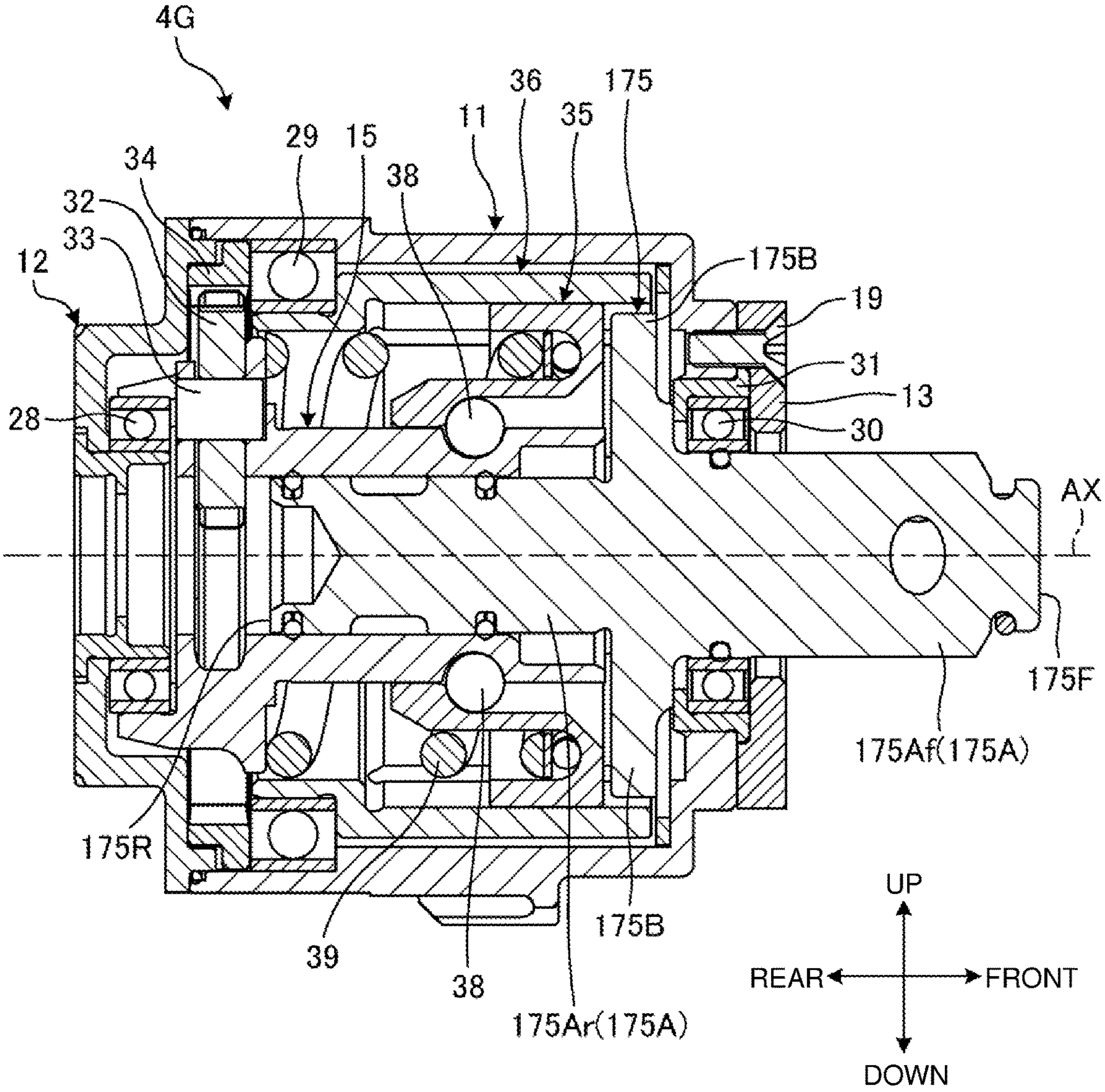
FIG. 30 is a longitudinal sectional view of a body assembly in a seventh embodiment.
Figure 31:
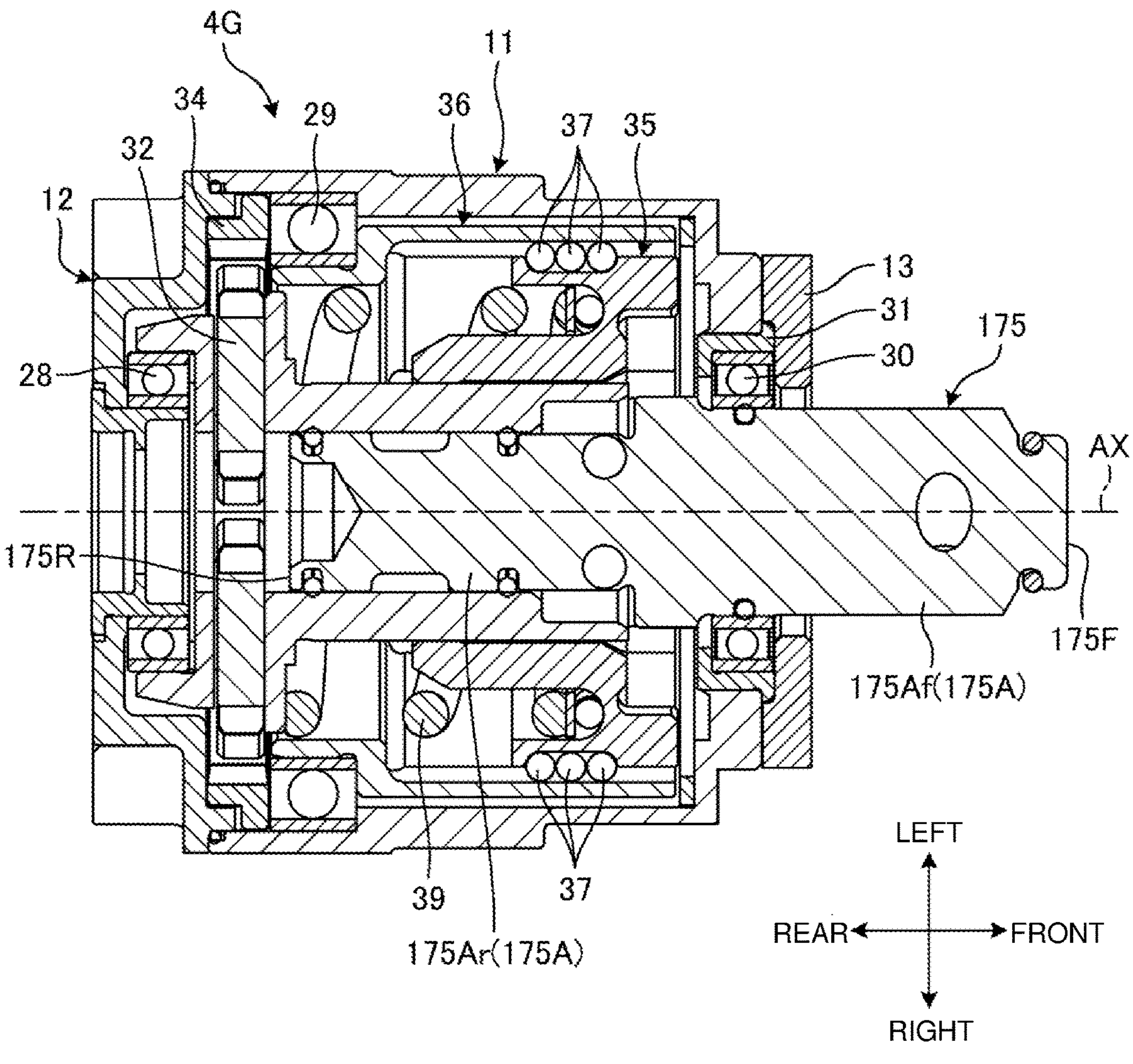
FIG. 31 is a horizontal sectional view of the body assembly in the seventh embodiment.
Figure 32:
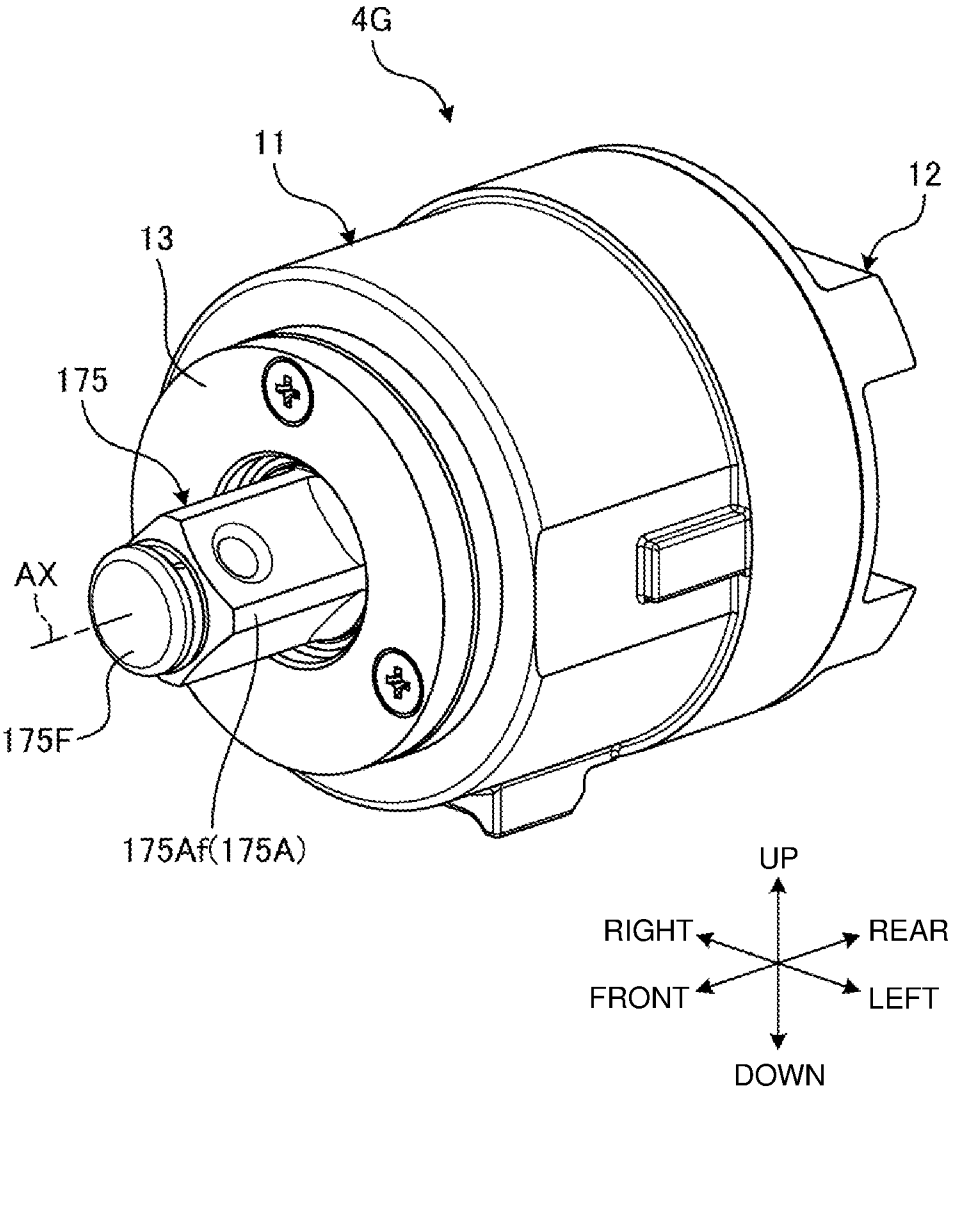
FIG. 32 is a front perspective view of the body assembly in the seventh embodiment.

FIG. 30 is a longitudinal sectional view of a body assembly 4G in the present embodiment. FIG. 31 is a horizontal sectional view of the body assembly 4G in the present embodiment. FIG. 32 is a front perspective view of the body assembly 4G in the present embodiment.

In the first embodiment, the body assembly 4A is a part of an impact driver. In the present embodiment, the body assembly 4G is a part of an impact wrench.

The body assembly 4G includes an anvil 175. The body assembly 4G in the present embodiment includes no tool holder (18). The body assembly 4G in the present embodiment includes components that are equivalent to those in the body assembly 4A described in the first embodiment, except for the anvil 175.

The anvil 175 includes an anvil shaft 175A and anvil projections 175B. The anvil projections 175B protrude radially outward from the anvil shaft 175A. The anvil projections 175B are strikable by the inner hammer 35 in the rotation direction.

The anvil shaft 175A includes a rear shaft portion 175Ar and a front shaft portion 175Af. The rear shaft portion 175Ar is located rearward from the anvil projections 175B. The front shaft portion 175Af is located frontward from the anvil projections 175B. The rear shaft portion 175Ar may be longer than or shorter than the front shaft portion 175Af. The rear shaft portion 175Ar is placed inside the spindle 15. The anvil shaft 175A has a rear end 175R located rearward from the balls 38. The anvil shaft 175A has a front end 175F located frontward from the front cover 13. The front shaft portion 175Af receives a socket as a tip tool.

Other Embodiments

In the above embodiments, the power tool 1 may use utility power (alternating current power supply) instead of the battery pack 20.

REFERENCE SIGNS LIST

1 power tool
2 housing
2A motor compartment
2B grip
2C battery holder
2L left housing
2R right housing
2S screw
3 rear cover
3S screw
4A body assembly
4B body assembly
4C body assembly
4D body assembly
4E body assembly
4F body assembly
4G body assembly
5 battery mount
6 motor
7 fan
7A inlet
7B outlet
7C bush
8 controller
8A circuit board
8B case
9 trigger switch
9A trigger lever
9B switch body
10 forward-reverse switch lever
11 hammer case
11A smaller-outer-diameter surface
11B step surface
11C larger-outer-diameter surface
11D smaller-inner-diameter surface
11E step surface
11F larger-inner-diameter surface
11G protrusion
11H boss
11J threaded hole
11K guide hole
11L recess
11M recess
11S cylinder
11T front plate
12 gear case
12A ring
12B rear plate
12C protrusion
12D recess
13 front cover
13A through-hole
14 reducer
15 spindle
15A spindle shaft
15B flange
15C pin support
15D bearing retainer
15E connection portion
15F support hole
15G support hole
15H spindle groove
15J support hole
16 striker
17 anvil
17A anvil shaft
17B anvil projection
17Ar rear shaft portion
17Af front shaft portion
17F front end
17G first surface
17H step surface
17J second surface
17K groove
17R rear end
18 tool holder
19 screw
20 battery pack
21 stator
21A stator core
21B rear insulator
21C front insulator
21D coil
21E connecting wire
22 rotor
22A rotor core
22B rotor shaft
22C rotor magnet
22D sensor magnet
23 sensor board
23S screw
24 rotor bearing
25 rotor bearing
26 bearing holder
27 pinion gear
28 spindle bearing
29 hammer bearing
30 anvil bearing
31 bearing holder
31A first portion
31B second portion
31C third portion
32 planetary gear
33 pin
34 internal gear
34A protrusion
35 inner hammer
35A hammer body
35B hammer projection
35C recess
35D holding groove
35E hammer groove
36 outer hammer
36A larger-outer-diameter surface
36B step surface
36C smaller-outer-diameter surface

36D guide groove
37 connector
38 ball
39 coil spring
40 washer
41 ball
42 insertion hole
43 locking member
44 bit sleeve
44A contact portion
44B cylinder
44C operation portion
45 operable member
45A ring
45B cam
45C recess
45D protrusion
45E cam
46 transmission (converter)
47 positioner
47A body
47B protrusion
48 sleeve spring
49 elastic ring
50 support recess
51 through-hole
52 pin
52A groove
53 bit washer
53A ring
53B protrusion
53C protrusion
54 space
55 O-ring
56 O-ring
57 O-ring
58 O-ring
59 washer
60 washer
61 tip tool
61A groove
61B tapered surface
62 washer
110 hammer case
112 hammer case
112H boss
112S cylinder
112T front plate
114 hammer case
122 gear case
124 gear case
152 spindle
154 spindle
170 anvil
172 anvil
173 anvil
174 anvil
174A anvil shaft
174B anvil projection
174G first surface
174H step surface
174J second surface
175 anvil
175A anvil shaft
175Af front shaft portion
175Ar rear shaft portion
175B anvil projection
175F front end
175R rear end
184 tool holder
282 spindle bearing
284 spindle bearing
302 anvil bearing
304 anvil bearing
314 ring member
322 planetary gear
324 planetary gear
332 pin
334 pin
342 internal gear
344 internal gear
352 hammer
354 hammer
382 ball
384 ball
392 coil spring
394 coil spring
422 insertion hole
423 insertion hole
424 insertion hole
442A contact portion
442B front plate
442C operation portion
442D cylinder
432 locking member
443A cylinder
443B operation portion
443C recess
450 operable member
451 operable member
451A ring
451B push portion
451E push surface
452 operable member
453 operable member
482 sleeve spring
483 sleeve spring
490 coil spring
500 support hole
502 support recess
503 support recess
510 opening
512 through-hole
513 through-hole
AX rotation axis
D1 distance
D2 distance
Lf length
Lr length

What is claimed is:

1. An impact tool, comprising:
a motor;
a spindle located frontward from the motor and rotatable by the motor;
a hammer supported by the spindle;
an anvil strikable by the hammer in a rotation direction, the anvil having an insertion hole extending rearward from a front end of the anvil;
a locking member supported by the anvil and movable to a locking position for locking a tip tool placed in the insertion hole and to an unlocking position for unlocking the tip tool; and
a bit sleeve surrounding the anvil, the bit sleeve being movable to a movement-restricting position for restricting radially outward movement of the locking member and to a movement-permitting position for permitting radially outward movement of the locking member, the bit sleeve being at least partly between the hammer and the anvil in a radial direction.

2. The impact tool according to claim 1, wherein the hammer and the locking member overlap each other in an axial direction.

3. The impact tool according to claim 1, further comprising:

a bearing supporting the anvil in a rotatable manner, wherein the bit sleeve is located rearward from the bearing.

4. An impact tool, comprising:

a motor;

a spindle located frontward from the motor and rotatable by the motor;

a hammer supported by the spindle;

an anvil strikable by the hammer in a rotation direction, the anvil having an insertion hole extending rearward from a front end of the anvil;

a bearing supporting the anvil in a rotatable manner;

a locking member supported by the anvil and movable to a locking position for locking a tip tool placed in the insertion hole and to an unlocking position for unlocking the tip tool;

a bit sleeve surrounding the anvil, the bit sleeve being movable to a movement-restricting position for restricting radially outward movement of the locking member and to a movement-permitting position for permitting radially outward movement of the locking member, the bit sleeve being located rearward from the bearing; and a hammer case holding the bearing, wherein the bit sleeve is accommodated rearward of the bearing in the hammer case.

5. The impact tool according to claim 3, wherein the locking member is located rearward from the bearing.

6. The impact tool according to claim 4, wherein the hammer case accommodates at least a part of the anvil.

7. The impact tool according to claim 4, wherein the locking member is accommodated in the hammer case.

8. The impact tool according to claim 4, further comprising:

an operable member operable to move the bit sleeve; and a transmission configured to transmit a force applied to the operable member to the bit sleeve, wherein the operable member is located outside the hammer case.

9. The impact tool according to claim 1, wherein the anvil has a support recess on an outer surface of the anvil, the locking member includes a ball supported in the support recess, the anvil has a through-hole connecting an inner surface of the support recess to an inner surface of the insertion hole, the locking member is at least partly receivable in a groove on a side surface of the tip tool through the through-hole to lock the tip tool, and the locking position includes a position at which the locking member is at least partly received in the groove.

10. The impact tool according to claim 2, further comprising:

a bearing supporting the anvil in a rotatable manner, wherein the bit sleeve is located rearward from the bearing.

11. The impact tool according to claim 4, wherein the locking member is located rearward from the bearing.

12. The impact tool according to claim 5, further comprising:

a hammer case holding the bearing, wherein the bit sleeve is accommodated in the hammer case.

13. The impact tool according to claim 6, wherein the locking member is accommodated in the hammer case.

14. The impact tool according to claim 6, further comprising:

an operable member operable to move the bit sleeve; and a transmission configured to transmit a force applied to the operable member to the bit sleeve, wherein the operable member is located outside the hammer case.

15. The impact tool according to claim 7, further comprising:

an operable member operable to move the bit sleeve; and a transmission configured to transmit a force applied to the operable member to the bit sleeve, wherein the operable member is located outside the hammer case.

16. The impact tool according to claim 2, wherein the anvil has a support recess on an outer surface of the anvil, the locking member includes a ball supported in the support recess, the anvil has a through-hole connecting an inner surface of the support recess to an inner surface of the insertion hole, the locking member is at least partly receivable in a groove on a side surface of the tip tool through the through-hole to lock the tip tool, and the locking position includes a position at which the locking member is at least partly received in the groove.

* * * * *